(12) United States Patent
Chu et al.

(10) Patent No.: US 12,167,487 B1
(45) Date of Patent: Dec. 10, 2024

(54) WIFI NETWORK OPERATION WITH CHANNEL AGGREGATION

(71) Applicant: Marvell Asia Pte Ltd, Singapore (SG)

(72) Inventors: Liwen Chu, San Ramon, CA (US); Hongyuan Zhang, Fremont, CA (US); Hui-Ling Lou, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/238,933

(22) Filed: Aug. 28, 2023

Related U.S. Application Data

(63) Continuation of application No. 17/839,269, filed on Jun. 13, 2022, now Pat. No. 11,743,960, which is a
(Continued)

(51) Int. Cl.
*H04W 76/15* (2018.01)
*H04W 48/02* (2009.01)
*H04W 84/12* (2009.01)

(52) U.S. Cl.
CPC ........... *H04W 76/15* (2018.02); *H04W 48/02* (2013.01); *H04W 84/12* (2013.01)

(58) Field of Classification Search
None
See application file for complete search history.

(56) References Cited

U.S. PATENT DOCUMENTS 8,773,969 B1 * 7/2014 Zhang ................. H04J 1/00
370/208
9,450,743 B1   9/2016 Chu et al.
(Continued)

FOREIGN PATENT DOCUMENTS

EP   2028809 A2   2/2009
EP   2999252 A1   3/2016
(Continued)

OTHER PUBLICATIONS

Fischer et al., "IEEE P802.11—Wireless LANs—Disallowed Sub channels," doc. No. IEEE 802.11-18/0496r3, The Institute of Electrical and Electronics Engineers, pp. 1-11 (May 2018).
(Continued)

*Primary Examiner* — Hong S Cho

(57) ABSTRACT

A client station receives a first data unit from an access point (AP) of a wireless local area network (WLAN). The first data unit includes a first WLAN management frame having an indication that the AP is operating in a plurality of frequency segments. The first WLAN management frame includes respective MAC addresses utilized by the AP for operation in the respective frequency segments. Responsive to receiving the first WLAN management frame, the client station generates a second WLAN management frame. The second WLAN management frame includes, for each of multiple frequency segments among the plurality of frequency segments, respective operation information indicating respective operation parameters of the client station for the respective frequency segment. The client station transmits a second data unit having the second WLAN management frame in connection with establishing communication with the AP using the multiple frequency segments.

20 Claims, 9 Drawing Sheets

Related U.S. Application Data continuation of application No. 16/877,354, filed on May 18, 2020, now Pat. No. 11,363,657.

(60) Provisional application No. 62/877,207, filed on Jul. 22, 2019, provisional application No. 62/849,043, filed on May 16, 2019.

(56) References Cited

U.S. PATENT DOCUMENTS

| | | | |
|---|---|---|---|
| 10,004,069 B2* | 6/2018 | Adachi | H04W 48/08 |
| 10,129,881 B2 | 11/2018 | Yang et al. | |
| 10,257,806 B2 | 4/2019 | Chu et al. | |
| 10,349,413 B2 | 7/2019 | Zhang et al. | |
| 10,785,706 B2* | 9/2020 | Verma | H04W 8/005 |
| 11,363,657 B1 | 6/2022 | Chu et al. | |
| 11,743,960 B1 | 8/2023 | Chu et al. | |
| 2006/0073827 A1* | 4/2006 | Vaisanen | H04W 36/0058 |
| | | | 455/436 |
| 2006/0114928 A1* | 6/2006 | Utsunomiya | H04W 74/0875 |
| | | | 370/448 |
| 2006/0223574 A1* | 10/2006 | Chandra | H04W 88/06 |
| | | | 455/552.1 |
| 2011/0249659 A1 | 10/2011 | Fontaine et al. | |
| 2013/0266136 A1* | 10/2013 | Chu | H04W 36/0033 |
| | | | 380/34 |
| 2014/0376474 A1* | 12/2014 | Lee | H04W 48/16 |
| | | | 370/329 |
| 2016/0212748 A1 | 7/2016 | Yang et al. | |
| 2016/0302200 A1* | 10/2016 | Yang | H04L 1/0041 |
| 2017/0048048 A1* | 2/2017 | Seok | H04L 1/1607 |
| 2017/0149547 A1 | 5/2017 | Kim et al. | |
| 2017/0181136 A1 | 6/2017 | Bharadwaj et al. | |
| 2017/0257189 A1* | 9/2017 | Jiang | H04L 1/1635 |
| 2017/0280343 A1* | 9/2017 | Chu | H04B 17/24 |
| 2017/0311204 A1* | 10/2017 | Cariou | H04W 28/085 |
| 2017/0325178 A1 | 11/2017 | Verma et al. | |
| 2017/0366329 A1 | 12/2017 | Cao et al. | |
| 2018/0020476 A1 | 1/2018 | Aijaz et al. | |
| 2018/0115403 A1 | 4/2018 | Sakai et al. | |
| 2018/0302858 A1 | 10/2018 | Son et al. | |
| 2019/0036651 A1* | 1/2019 | Chitrakar | H04L 1/1832 |
| 2019/0123863 A1 | 4/2019 | Zhang et al. | |
| 2019/0182714 A1 | 6/2019 | Chu et al. | |
| 2019/0182863 A1 | 6/2019 | Chu et al. | |
| 2019/0208464 A1* | 7/2019 | Lee | H04W 48/20 |
| 2019/0349930 A1 | 11/2019 | Chu et al. | |
| 2021/0037451 A1* | 2/2021 | Morioka | H04W 48/16 |
| 2021/0227547 A1* | 7/2021 | Chitrakar | H04L 5/0091 |

FOREIGN PATENT DOCUMENTS

| | | |
|---|---|---|
| GB | 2501898 A | 11/2013 |
| WO | 2006000955 A1 | 1/2006 |
| WO | 2012026779 A2 | 3/2012 |
| WO | 2013168105 A1 | 11/2013 |
| WO | 2013179270 A1 | 12/2013 |
| WO | 2015099803 A1 | 7/2015 |
| WO | 2017026937 A1 | 2/2017 |
| WO | 2017111567 A2 | 6/2017 |

OTHER PUBLICATIONS

IEEE P802.11axTM/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE P802.11axTM/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

IEEE Std 802.11-REVmcTM/D8.0 (revision of IEEE Std. 802.11TM-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

Orfanos et al., "A New Distributed Coordination Function for W-LANs with Multiple Channel Structure," Proceedings of the 14th 1st Mobile and Wireless Communications Summit; Dresden, Germany, 5 pages (Jun. 19, 2005).

Zhang et al., "EHT Technology Candidate Discussions," doc: IEEE 802.11-18/1161r0, The Institute of Electrical and Electronics Engineers, Inc., pp. 1-10 Jul. 8, 2018.

* cited by examiner

| HT Capabilities Information Element | VHT Capabilities Information Element | HE Capabilities Information element | EHT Capabilities Information Element | Extended Capabilities Information Element |
|---|---|---|---|---|
| 602-1 | 602-2 | 602-3 | 602-4 | 602-5 |

600

| HT Operations Information Element | VHT Operations Information Element | HE Operations Information element | EHT Operations Information Element |
|---|---|---|---|
| 604-1 | 604-2 | 604-3 | 604-4 |

| HT Capabilities Information Element | VHT Capabilities Information Element | HE Capabilities Information element | EHT Capabilities Information Element | Extended Capabilities Information Element |
|---|---|---|---|---|
| 702-1 | 702-2 | 702-3 | 702-4 | 702-5 |

700

| HT Operations Information Element | VHT Operations Information Element | HE Operations Information element | EHT Operations Information Element |
|---|---|---|---|
| 704-1 | 704-2 | 704-3 | 704-4 |

| Other Band Information Element |
|---|
| 706 |

WIFI NETWORK OPERATION WITH CHANNEL AGGREGATION

CROSS REFERENCES TO RELATED APPLICATIONS

The present application is a continuation application of U.S. application Ser. No. 17/839,269, file on Jun. 13, 2022, entitled "WiFi Network Operation with Channel Aggregation," which is a continuation of U.S. application Ser. No. 16/877,354, entitled "WiFi Network Operation with Channel Aggregation," filed on May 18, 2020, which claims the benefit of U.S. Provisional Patent Application No. 62/849,043, entitled "Basic Service Set (BSS) Operation with Band Aggregation-Capabilities and Basic Service Set (BSS) Operation," filed on May 16, 2019, and U.S. Provisional Patent Application No. 62/877,207, entitled "Basic Service Set (BSS) Operation with Band Aggregation-Capabilities and Basic Service Set (BSS) Operation," filed on Jul. 22, 2019. All of the applications referenced above are incorporated herein by reference in their entireties.

FIELD OF TECHNOLOGY

The present disclosure relates generally to wireless communication systems, and more particularly to operation of a network with multiple aggregated communication channels.

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data rates. One way in which data rates have been increased is by increasing the frequency bandwidth of communication channels used in WLANs. For example, the IEEE 802.11n Standard permits aggregation of two 20 MHz sub-channels to form a 40 MHz aggregate communication channel, whereas the more recent IEEE 802.11ax Standard permits aggregation of up to eight 20 MHZ sub-channels to form up to 160 MHz aggregate communication channels. Work has now begun on a new iteration of the IEEE 802.11 Standard, which is referred to as the IEEE 802.11bc Standard, or Extremely High Throughput (EHT) WLAN. The IEEE 802.11be Standard may permit aggregation of as many as sixteen 20 MHz sub-channels (or perhaps even more) to form up to 320 MHz aggregate communication channels (or perhaps even wider aggregate communication channels). Additionally, the IEEE 802.11be Standard may permit aggregation 20 MHz sub-channels in different channel segments (for example, separated by a gap in frequency) to form a single aggregate channel. Further, the IEEE 802.11be Standard may permit aggregation of 20 MHz sub-channels in different radio frequency (RF) bands to form a single aggregate channel.

The current draft of the IEEE 802.11ax Standard (referred to herein as "the IEEE 802.11ax Standard" for simplicity) defines an "80+80" transmission mode in which a communication device simultaneously transmits in two 80 MHz channel segments within a single radio frequency (RF) band. The two 80 MHz channel segments may be separated in frequency within the single RF band. Network parameters, such as media access control (MAC) address of a communication device, capabilities of devices operating in (or wishing to join) the network, operating parameters used in the network, etc., are defined to be the same across the two 80 MHz channel segments.

SUMMARY

In an embodiment, a method of operation in a wireless local area network (WLAN) includes: receiving, at a wireless network interface of a client station, a first data unit from an access point (AP), the first data unit including a first WLAN management frame having an indication that the AP is operating in a plurality of frequency segments, and the first WLAN management frame including respective MAC addresses utilized by the AP for operation in the respective frequency segments; responsive to receiving the first WLAN management frame, generating, at the wireless network interface, a second WLAN management frame, the second WLAN management frame including, for each of multiple frequency segments among the plurality of frequency segments, respective operation information indicating respective operation parameters of the client station for the respective frequency segment; and transmitting, by the wireless network interface, a second data unit having the second WLAN management frame in connection with establishing communication with the AP using the multiple frequency segments.

In another embodiment, a communication device comprises a wireless network interface device corresponding to a client station in a WLAN. The wireless network device includes one or more integrated circuit (IC) devices configured to: receive a first data unit from an AP of the WLAN, the first data unit including a first WLAN management frame having an indication that the AP is operating in a plurality of frequency segments, and the first WLAN management frame including respective MAC addresses utilized by the AP for operation in the respective frequency segments; responsive to receiving the first WLAN management frame, generate a second WLAN management frame, the second WLAN management frame including, for each of multiple frequency segments among the plurality of frequency segments, respective operation information indicating respective operation parameters of the client station for the respective frequency segment; and control the wireless network interface to transmit a second data unit having the second WLAN management frame in connection with establishing communication with the AP using the multiple frequency segments.

BRIEF DESCRIPTION OF THE DRAWINGS

FIG. 6 is a block diagram of a portion of a management frame generated and transmitted by a communication device in a particular channel segment to broadcast information in the WLAN of FIG. 1, according to an embodiment;

FIG. 7 is a diagram of a portion of a management frame generated and transmitted by a communication device in a particular channel segment to provide information to another communication device in the WLAN of FIG. 1, according to an embodiment;

DETAILED DESCRIPTION

A next generation wireless local area network (WLAN) protocol (e.g., the IEEE 802.11be Standard, sometimes referred to as the Extremely High Throughput (EHT) WLAN Standard) may permit communication devices to operate with communication channels that comprise multiple channel segments. The different channel segments may be in a single radio frequency (RF) band or in different RF bands. The different channel segments may have a same bandwidth or different bandwidths. In various embodiments described below, at least some network parameters used by a communication device for operation in the multiple channel segments are different in different ones of the channel segments. For example, different media access control (MAC) addresses are utilized by a communication device for operation in different ones of the channel segments. Using different MAC addresses in different ones of the channel segments allows legacy communication devices that do not support operation with multiple channel segment aggregation to discover and associate with an access point in any ones of the multiple channel segments based on transmissions (e.g., beacon frame transmissions) of the access point with different MAC addresses of the AP in different ones of the multiple channel segments, in an embodiment.

Figure 1:
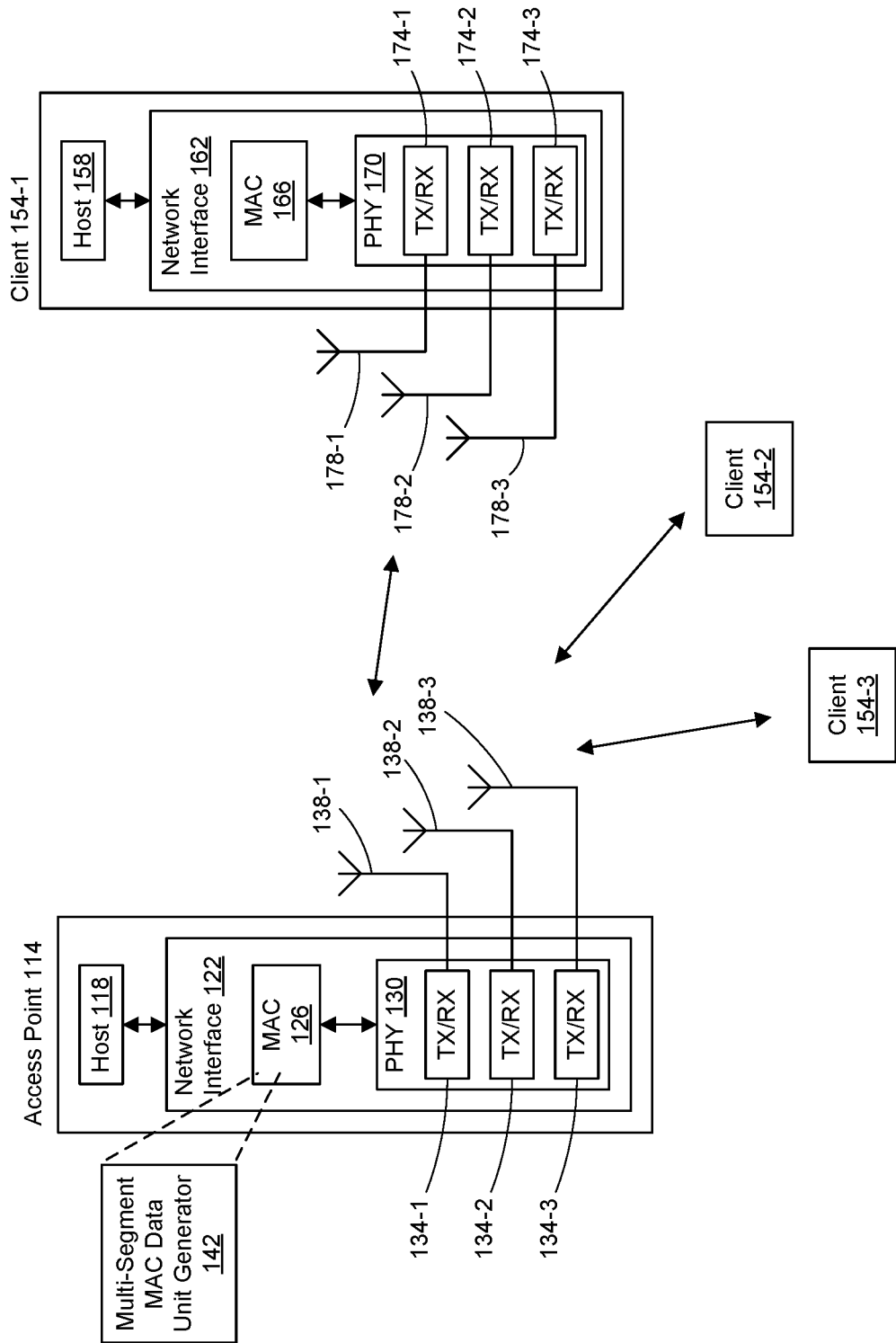
FIG. 1 is a block diagram of an example wireless local area network (WLAN), according to an embodiment.

FIG. 1 is a block diagram of an example wireless local area network (WLAN) 110, according to an embodiment. The WLAN 110 includes an access point (AP) 114 that comprises a host processor 118 coupled to a network interface device 122. The network interface device 122 includes one or more medium access control (MAC) processors 126 (sometimes referred to herein as "the MAC processor 126" for brevity) and one or more physical layer (PHY) processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), aggregate MPDUs (A-MPDUs), etc., and provide the MAC layer data units to the PHY processor 130. MPDUs and A-MPDUs exchanged between the MAC processor 126 and the PHY processor 130 are sometimes referred to as physical layer convergence procedure (PLCP) (or simply "PHY") service data units (PSDUs).

The PHY processor 130 may be configured to receive MAC layer data units (or PSDUs) from the MAC processor 126 and encapsulate the MAC layer data units (or PSDUs) to generate PHY data units such as PLCP (or "PHY") protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

PHY data units are sometimes referred to herein as "packets", and MAC layer data units are sometimes referred to herein as "frames".

In connection with generating one or more radio frequency (RF) signals for transmission, the PHY processor 130 is configured to process (which may include modulating, filtering, etc.) data corresponding to a PPDU to generate one or more digital baseband signals and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more signals RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In another embodiment, the MAC processor 126 includes a hardware state machine.

The MAC processor 126 includes, or implements, a multi-segment MAC data unit generator 142 that is configured to generate respective MAC data units for transmission in respective channel segments of a communication channel, according to an embodiment. The multi-segment MAC data unit generator 142 is configured to generate the respective MAC data units to include respective MAC addresses that the AP 114 utilizes for communication in respective ones of the channel segments, in an embodiment. In an embodiment, the AP 114 utilizes different MAC addresses for communicating in different ones of the channel segments and, accordingly, the multi-segment MAC data unit generator 142 is configured to generate the respective MAC data units to include the different MAC addresses. The multi-segment MAC data unit generator 142 is configured to provide the respective MAC data units that include the respective MAC addresses of the AP 114 to the PHY processor 130 for simultaneous transmission in the multiple channel segments of the communication channel, in an embodiment.

In an embodiment, the multi-segment MAC data unit generator 142 is implemented by a processor executing machine readable instructions stored in a memory, where the machine readable instructions cause the processor to perform acts described in more detail below. In another embodiment, the multi-segment MAC data unit generator 142 additionally or alternatively comprises hardware circuitry that is configured to perform acts described in more detail below. In some embodiments, the hardware circuitry comprises one or more hardware state machines that are configured to perform acts described in more detail below.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface device 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In some embodiments, the MAC processor 166 includes a multi-channel segment transmission controller (not shown) the same as or similar to the multi-segment MAC data unit generator 142 of the AP 114. For example, the client station 154-1 is configured to generate MAC data units that include different MAC addresses used by the client station 154-1 for communication in respective ones of multiple channel segments of a communication channel, according to some embodiments.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

In an embodiment, multiple different frequency bands within the RF spectrum are employed for signal transmissions within the WLAN 110. In an embodiment, different communication devices (i.e., the AP 114 and the client stations 154) may be configured for operation in different frequency bands. In an embodiment, at least some communication devices (e.g., the AP 114 and the client station 154) in the WLAN 110 may be configured for simultaneous operation over multiple different frequency bands. Exemplary frequency bands include, a first frequency band corresponding to a frequency range of approximately 2.4 GHZ-2.5 GHz ("2.4 GHz band"), and a second frequency band corresponding to a frequency range of approximately 5 GHZ-5.9 GHZ ("5 GHz band") of the RF spectrum. In an embodiment, one or more communication devices within the WLAN may also be configured for operation in a third frequency band in the 6 GHZ-7 GHz range ("6 GHz band"). Each of the frequency bands comprise multiple component channels which may be combined within the respective frequency bands to generate channels of wider bandwidths, as described above. In an embodiment corresponding to multi-channel segment operation over a first channel segment and a second channel segment, the first channel segment and the second channel segment may be in separate frequency bands, or within a same frequency band. In some embodiments, at least one communication device (e.g., at least the AP 114) in the WLAN 110 is configured for simultaneous operation over any two of the 2.4 GHz band, the 5 GHz band, and the 6 GHz band. In some embodiments, at least one communication device (e.g., at least the AP 114) in the WLAN 110 is configured for simultaneous operation over all three of the 2.4 GHz band, the 5 GHz band, and the 6 GHz band.

Although the WLAN 110 is illustrated as including only a single AP 114, the WLAN 110 includes multiple coordinated APs, in some embodiments. The multiple coordinated APs are configured to operate in a distributed manner, where respective ones of the multiple APs are configured to operate in respective ones of multiple channel segments. In such embodiments, respective ones of the multiple coordinated APs are configured to generate and transmit respective MAC data units as described herein in a communication channel that comprises multiple channel segments, where respective ones of the multiple coordinated APs generate and transmit respective ones of the multiple MAC data units in the respective channel segments.

Figure 2:
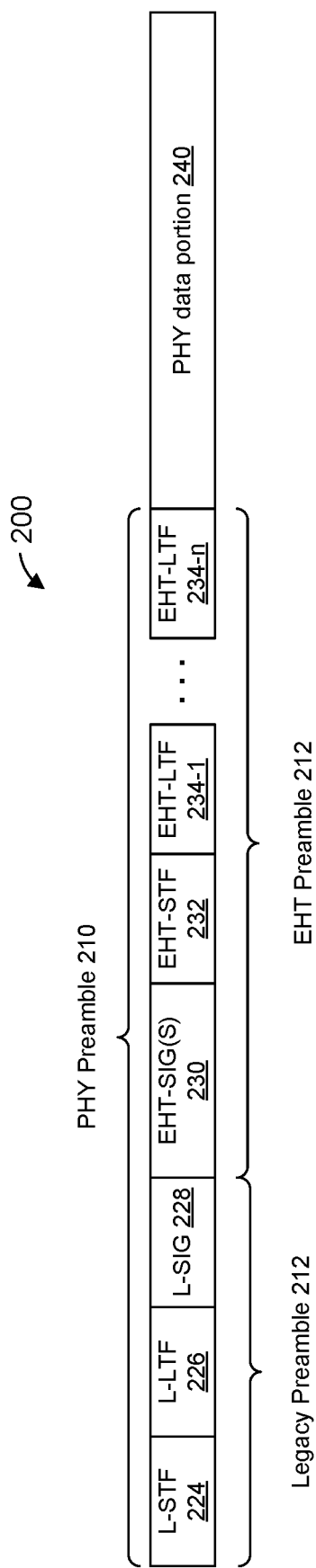
FIG. 2 is a block diagram of an example physical layer (PHY) data unit transmitted in the WLAN of FIG. 1, according to an embodiment.

FIG. 2 is a diagram of an example PPDU 200, according to an embodiment. In an embodiment, the AP 114 (FIG. 1) is configured to (e.g., the network interface device 122 is configured to, the PHY processor 130 is configured to, the multi-channel transmit processor 146 is configured to, etc.) generate and transmit the PPDU 200 to one or more client stations 154. In an embodiment, the network device 122 (FIG. 1) is configured to (e.g., the network interface device 122 is configured to, the PHY processor 130 is configured to, the multi-channel transmit processor 146 is configured to, etc.) generate multiple PPDUs such as the PPDU 200, and to simultaneously transmit the multiple PPDUs in respective ones of multiple channel segments to one or more client stations 154. In another embodiment, a client station 154 (FIG. 1) is configured to (e.g., the client station 154-1 is configured to, the network interface device 162 is configured to, the PHY processor 170 is configured to, etc.) generate and transmit one or more PPDUs such as the PPDU 200, and to simultaneously transmit the one or more PPDUs in respective ones of one or more channel segments to the AP 114.

The PPDU 200 includes a PHY preamble 210 which, in turn, includes a legacy PHY preamble portion 212 (sometimes referred to as a legacy preamble 212), a non-legacy PHY preamble portion (e.g., an EHT preamble) 216 (sometime referred to as a EHT preamble 216), and a PHY data portion 220. The legacy preamble 212 comprises a legacy short training field (L-STF) 224, a legacy long training field (L-LTF) 228, and a legacy signal field (L-SIG) 232. In an embodiment, the STFs 224 and the LTFs 228 are used for packet detection, automatic gain control (AGC), frequency offset estimation, channel estimation, etc. The L-SIG 232 includes a rate subfield (not shown) and a length subfield (not shown) that together indicate a duration of the PPDU 200. The EHT preamble 216 includes one or more EHT signal fields 230, an EHT STF field 232 and one or more EHT LTF fields 234. The one or more EHT signal fields 230 include PHY parameters regarding the PPDU 200 that are for use by receiver devices to properly process the PPDU 200, such as a bandwidth subfield that indicates a frequency bandwidth of the PHY data portion 240 PPDU 200 of the PPDU 200, a modulation and coding scheme (MCS) subfield that indicates an MCS used for the PHY data portion 240 of the PPDU 200, a number of spatial/space-time streams (Nss) subfield that indicates a Nss used for transmission of the PHY data portion 240 PPDU 200 of the PPDU 200, etc., in an embodiment. In an embodiment, the number of the EHT LTF fields 234 correspond to a number of spatial/space-time streams used for transmission of the PPDU 200.

In an embodiment, the PPDU 200 is a multi-user (MU) orthogonal frequency division multiple access (OFDMA) data unit in which independent data streams are transmitted to multiple client stations 154 using respective sets of OFDM tones allocated to the client stations 154. For example, in an embodiment, available OFDM tones (e.g., OFDM tones that are not used as DC tone and/or guard tones) are segmented into multiple resource units (RUs), and each of the multiple RUs is allocated to data to one or more client stations 154. In an embodiment, the independent data streams in respective allocated RUs are further transmitted using respective spatial streams, allocated to the client stations 154, using multiple-input multiple-output (MIMO) techniques. In an embodiment, the PPDU 200 is an MU-MIMO PHY data unit in which independent data streams are transmitted to multiple client stations 154 using respective spatial streams allocated to the client stations 154.

In an embodiment, the PPDU 200 has a 20 MHz frequency bandwidth and is transmitted in a 20 MHz channel. In other embodiments, the PPDU 200 may have a frequency bandwidth of 40 MHZ, 80 MHZ, 100 MHZ, 120 MHZ, etc., and is correspondingly transmitted over a 40 MHZ, 80 MHz, 100 MHZ, 120 MHZ, etc., channel, respectively. In some such embodiments, at least a portion of the PPDU 200 (e.g., at least the PHY preamble 212, or the entirety of the PHY preamble 210) is generated by generating a field corresponding to a 20 MHZ component channel bandwidth and repeating the field over a number of 20 MHz component channels corresponding to the transmission channel, so that the PPDU 200 includes a same legacy preamble 212 in each 20 MHz component channels that comprise the transmission channel, in an embodiment. For example, in an embodiment in which the PPDU 200 occupies an 80 MHz channel, at least the legacy preamble 212 corresponding to the 20 MHz component channel bandwidth is replicated in each of four 20 MHz component channels that comprise the 80 MHz channel, so that the PPDU 200 includes a same legacy preamble 212 in each of the four 20 MHz component channels that comprise the 80 MHz channel.

In an embodiment, the PHY data portion 240 includes one or more MPDUs generated by a network interface device (e.g., generated by the network interface device 122/162, generated by the MAC processor 126/166, generated by the multi-segment MAC data unit generator 142, etc.). In an embodiment in which multiple PHY data portions 240 are generated for simultaneous transmission over respective ones of multiple channel segments, respective PHY data portions 240 include respective MPDUs generated by the network interface device for simultaneous transmission over respective ones of the multiple channel segments.

Figure 3:
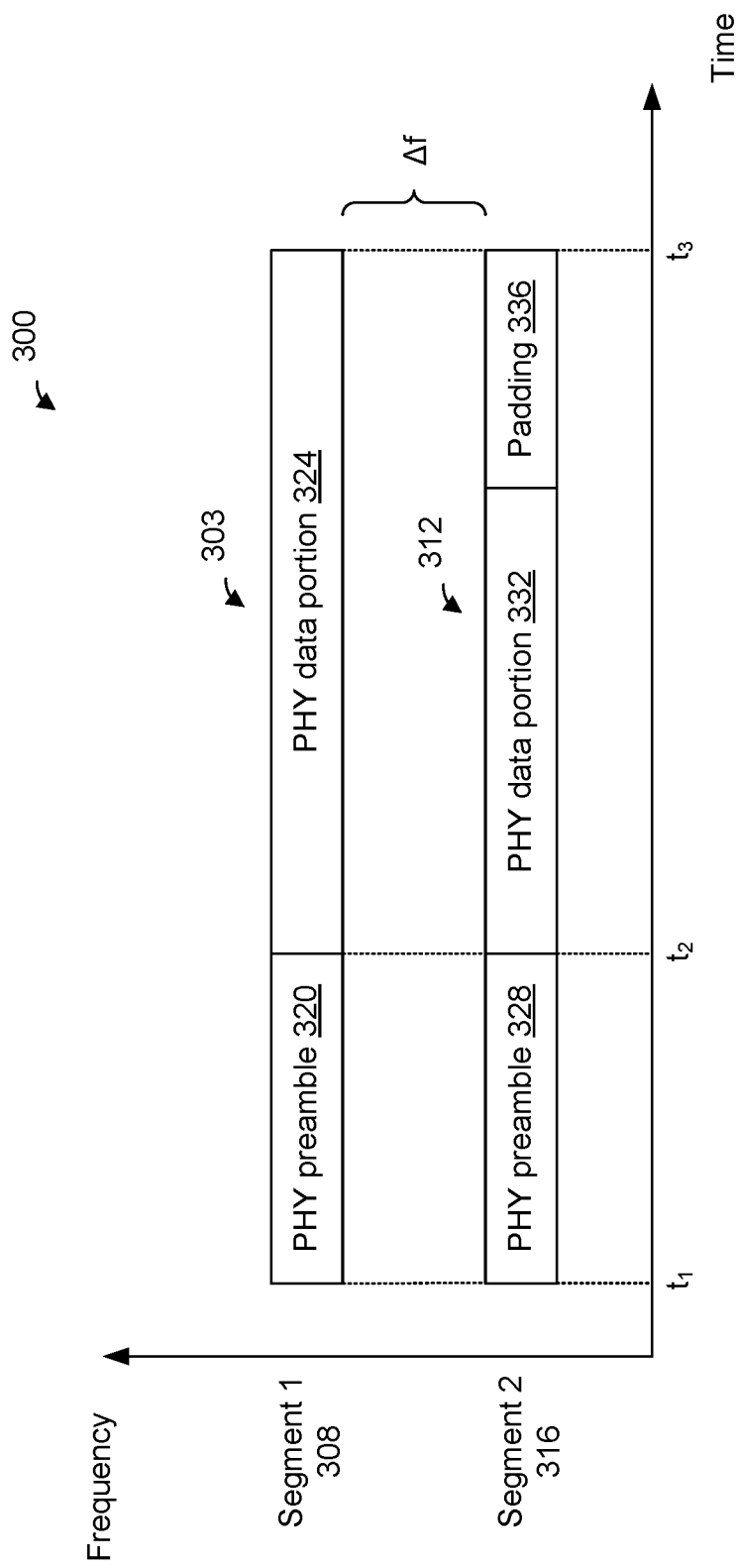
FIG. 3 is a diagram of an example transmission over multiple channel segments of a communication channel in the WLAN of FIG. 1, according to an embodiment.

FIG. 3 is a diagram of an example transmission 300 over multiple channel segments of a communication channel, according to an embodiment. In an embodiment, the AP 114 (FIG. 1) is configured to (e.g., the network interface device 122 is configured to, the PHY processor 130 is configured to, the multi-channel transmit processor 146 is configured to, etc.) generate and transmit the transmission 300 to one or more client stations 154. In another embodiment, a client station 154 (FIG. 1) is configured to (e.g., the client station 154-1 is configured to, the network interface device 162 is configured to, the PHY processor 170 is configured to, etc.) generate and transmit the transmission 300 to the AP 114 and/or one or more other client stations 154).

The transmission 300 comprises a PPDU 304 in a first channel segment 308 and a second PPDU 312 in a second channel segment 316. The first PPDU 504 comprises a PHY preamble 320 and a PHY data portion 324. The second PPDU 312 comprises a PHY preamble 328, a data portion 332, and optional padding 336. In an embodiment, the PHY preamble 320 and the PHY preamble 328 are formatted in a manner similar to the PHY preamble 210 of FIG. 2. In an embodiment, at least a portion of the PHY preamble 320 and at least a portion of the PHY preamble 328 have the same structure and/or include the same information. In an embodiment, at least a portion of the PHY preamble 320 and at least a portion of the PHY preamble 328 are identical.

In an embodiment, transmission of the first PPDU 304 of the transmission 300 is simultaneous with the transmission of the second PPDU 312 of the transmission 300. In an embodiment, the transmission 300 is synchronized such that transmission of the first PPDU 304 and the second PPDU 312 starts at a same time instance $t_1$ and ends at a same time instance $t_3$. In an embodiment, the transmission 300 is further synchronized such the PHY preamble 320 and the PHY preamble 328 are of a same duration. In an embodiment in which the PHY data portion 332 has a shorter duration than the PHY data portion 324, the PHY data portion 332 is appended with the padding 336 so that transmission of the PPDU 312 ends at $t_3$. In other embodiments, the transmission 300 is asynchronous. For example, transmission of the first PPDU 302 does not start at a same time instance as transmission of the second PPDU 312 and/or transmission of the first PPDU 302 does not end at a same time instance as transmission of the second PPDU 312, in an embodiment.

In an embodiment in which the first channel segment 308 comprises multiple component channels, at least a portion of the PHY preamble 320 (e.g., a legacy portion) is generated by generating a field corresponding to one component channel and duplicating the field over one or more other component channels corresponding to the first channel segment 308. In an embodiment in which the second channel segment 316 comprises multiple component channels, at least a portion of the PHY preamble 328 (e.g., a legacy portion) is generated by generating a field corresponding to one component channel and duplicating the field over one or more other component channels corresponding to the second channel segment 316.

In various embodiments, the first channel segment 308 and the second channel segment 316 are in different RF bands or are co-located in a same RF band. In an embodiment, the RF band(s) correspond to the 2.4 GHz band, the 5 GHz band, and the 6 GHz bands, as described above. The first channel segment 308 and the second channel segment 316 may each be comprised of one or more of component channels. In an embodiment, a frequency bandwidth of the first channel segment 308 (i.e., a frequency bandwidth of the first PPDU 304) is different than a frequency bandwidth of the second channel segment 316 (i.e., a frequency bandwidth of the second PPDU 312). In another embodiment, the frequency bandwidth of the first channel segment 308 is the same as the frequency bandwidth of the second channel segment 316.

In an embodiment, the first channel segment 308 and the second channel segment 316 are separated in frequency. For example, a gap in frequency exists between the first channel segment 308 and the second channel segment 316. In various embodiments, the gap is at least 500 kHz, at least 1 MHZ, at least 5 MHZ, at least 20 MHz, etc.

In an embodiment, the transmission 300 corresponds to a single user (SU) transmission that is generated and transmitted to a single communication device. In an embodiment, the transmission 300 corresponds to a multi-user (MU) transmission that includes data for multiple communication devices (e.g., the client stations 154). For example, in an embodiment, the MU transmission 300 is an OFDMA transmission. In another embodiment, the MU transmission 300 is an MU-MIMO transmission. In an embodiment, one of the first PPDU 304 and the second PPDU 312 corresponds to an SU transmission, and the other one of the first PPDU 304 and second PPDU 312 corresponds to an MU transmission, such as an OFDMA or an MU-MIMO transmission. For example, a MAC data unit (e.g., MPDU, A-MPDU, etc.) included in the PHY data portion 324 of the first PPDU 304 includes multiple data streams for multiple communication for multiple communication devices (e.g., the client stations 154).

In an embodiment, the transmission 300 corresponds to a single PPDU, where a first frequency portion of the single PPDU is transmitted via the first channel 308 and a second frequency portion of the single PPDU is transmitted via the second channel 316. In another embodiment, the first PPDU 304 corresponds to a first PPDU and the second PPDU 312 corresponds to a second PPDU. In an embodiment, each of the PHY preambles 320 and 328, and the PHY data portions 324 and 332, are comprised of one or more OFDM symbols.

In some embodiments, in a simultaneous transmission in multiple channel segments, MAC headers of MPDUs simultaneously transmitted in the multiple channel segments include different information specific to the particular channel segments. For example, a communication device (e.g., the AP 114, the client station 154-1, etc.) utilizes different MAC addresses for operation in different ones of the channel segments, in an embodiment. Thus, for example, a source MAC address of the communication device indicated in a MAC header of an MPDU generated and transmitted by the communication device depends on the channel segment in which the MPDU is transmitted, in an embodiment. In an embodiment in which a communication device (e.g., the AP 114, the client station 154-1, etc.) utilizes different MAC addresses for operation in different ones of the channel segments, one of the different MAC addresses is used as the MAC address of the communication device by an upper layer (e.g., a layer implemented by the host processor 118, 158) that communicates with the MAC processor (e.g., the MAC processor 126, 166) of the communication device.

Figure 4A:
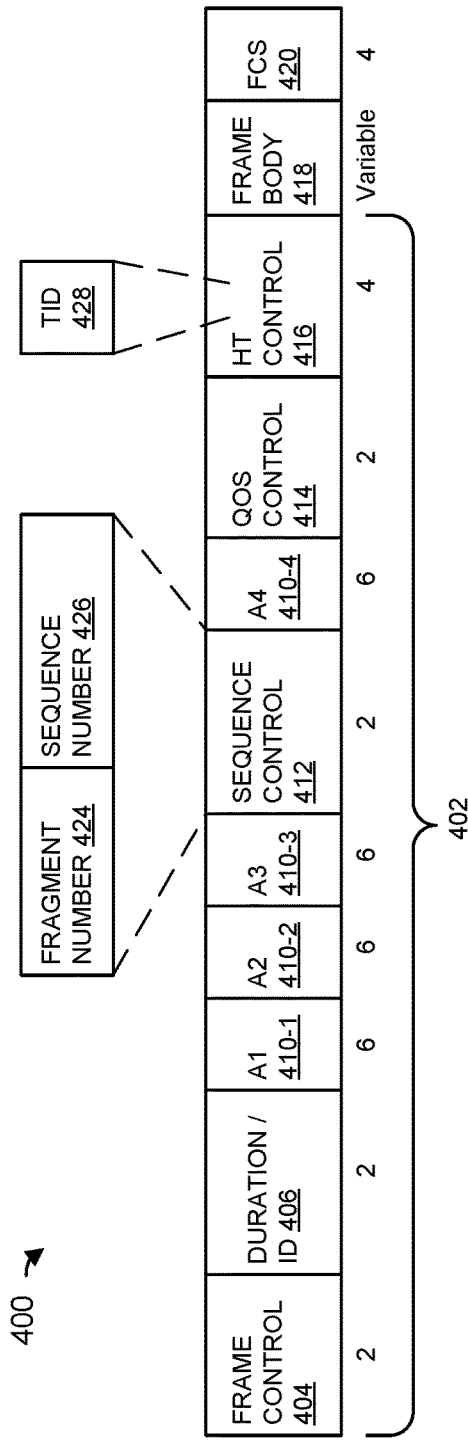
FIGS. 4A-B are diagrams of example medium access control (MAC) protocol data units (MPDU) that may be included in the transmission of FIG. 3, according to an embodiment.
Figure 4B:
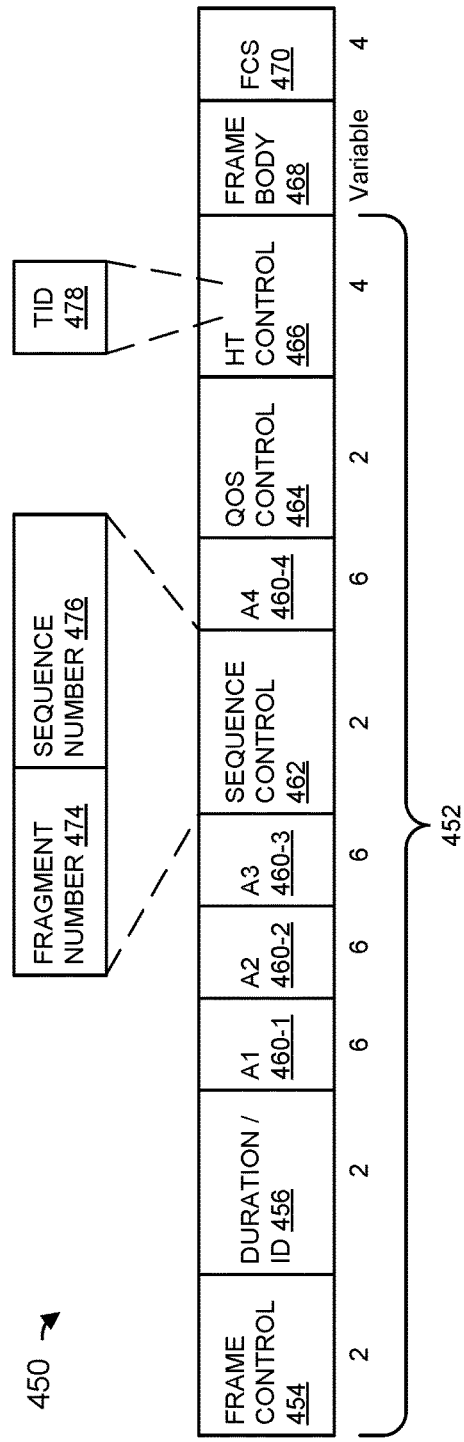

FIGS. 4A-B are diagrams of MPDUs 400, 450 that may be included, respectively, in the PHY data portion 324 of the transmission 303 of FIG. 3 and the data portion 332 of the transmission 312 of FIG. 3, according to an embodiment. The MPDU 400 includes a MAC header 402, a frame body 418, and a frame check sequence field 420. The number below each field in FIG. 4A indicates the number of octets occupied by the corresponding field of the MPDU 400, according to an embodiment. In other embodiments, other suitable numbers of octets (or bits) are occupied by the fields of the MDPU 400. The MAC header 402 includes a frame control field 404 (2 octets), a duration/ID field 406 (2 octets), a first address (A1) field 410-1 (6 octets), a second address (A2) field 410-2 (6 octets), a third address (A3) field (6 octets) 410-3, a sequence control field 412 (2 octets), a fourth address (A4) field 410-4 (6 octets), a QoS control field 414 (2 octets), and an HT control field 416 (4 octets), in the embodiment illustrated in FIG. 4. The sequence control field 412 includes a fragment number subfield 424 and a sequence number subfield 426. The HT control field 416 includes a traffic identifier (TID) subfield 428.

In some embodiments, the MAC header 402 omits one or more of the fields 404-416 illustrated in FIG. 4 and/or includes one or more additional fields not illustrated in FIG. 4. The data unit 400 also includes the frame body 418 and a four-octet frame check sequence (FCS) field 420. In some embodiments and/or scenarios, the frame body 418 is omitted (e.g., a null data frame). Each of the address fields 410 is a 48 bit (6 octet) field that includes a MAC address or other identifier of a device or a network associated with the data unit 400, such as a MAC address of a transmitter device of the data unit 400, a MAC addresses of an intended receiver device of the data unit 400, an identifier of a basic service set (BSS) in which the data unit 400 is transmitted, etc. In an embodiment, the first address field 410-1 includes a source MAC address associated with a transmitter device of the data unit 400, the second address field 410-1 includes a receiver MAC address of an intended receiver device of the data unit 400, the third address field 410-3 includes a BSSID in which the data unit 400 is transmitted, and the fourth address field 410-4 is omitted, in an embodiment.

Referring now to FIG. 4B, the MPDU 450 included in the data portion 332 of the transmission 312 of FIG. 3 is generally the same as to the MPDU 400 included in the data portion 324 of the transmission 303 of FIG. 3, in an embodiment. The MPDU 450 includes a MAC header 452, a frame body 468, and a frame check sequence field 470. The number above each field in FIG. 4B indicates the number of octets occupied by the corresponding field. Accordingly, the MAC header 402 includes a frame control field 404 (2 octets), a duration/ID field 406 (2 octets), a first address (A1) field 410-1 (6 octets), a second address (A2) field 410-2 (6 octets), a third address (A3) field (6 octets) 410-3, a sequence control field 412 (2 octets), a fourth address (A4) field 410-4 (6 octets), a QoS control field 414 (2 octets), and an HT control field 416 (4 octets). In some embodiments, the MAC header 402 omits one or more of the fields 404-416 illustrated in FIG. 4 and/or includes one or more additional fields not illustrated in FIG. 4. The data unit 400 also includes the frame body 418 and a four-octet frame check sequence (FCS) field 420. In some embodiments and/or scenarios, the frame body 418 is omitted (e.g., a null data frame). Each of the address fields 410 is a 48 bit (6 octet) field that includes a MAC address or other identifier of a device or a network associated with the data unit 400, such as a MAC address of a transmitter device of the data unit 400, a MAC addresses of an intended receiver device of the data unit 400, an identifier of a basic service set (BSS) in which the data unit 400 is transmitted, etc. In an embodiment, the first address field 410-1 includes a source MAC address associated with a transmitter device of the data unit 400, the second address field 410-1 includes a receiver MAC address of an intended receiver device of the data unit 400, the third address field 410-3 includes a BSSID in which the data unit 400 is transmitted, and the fourth address field 410-4 is omitted, in an embodiment In some embodiments, values of one or more of the address fields 410 of the data unit 400 depend on the particular channel segment, of a communication channel, in which the data unit 400 is transmitted. For example, in an embodiment in which a transmitter device that generates and transmits the data unit 400 utilizes different MAC addresses for operation in different channel segments of a communication channel, a source MAC address included in the header 402 (e.g., included in the first MAC address field 410-1) of the data unit 400 corresponds to the particular MAC address that the transmitter device utilizes for operation in the particular channel segment in which the data unit 400 is transmitted, in an embodiment. As another example, in an embodiment in which a receiver device that is an intended receiver of the data unit 400 utilizes different MAC addresses for operation in different channel segments of a communication channel, a receiver MAC address included in the header 402 (e.g., included in the second MAC address field 410-2) of the data unit 400 corresponds to the particular MAC address that the receiver device utilizes for operation in the particular channel segment in which the data unit 400 is transmitted, in an embodiment.

In an embodiment, the TID subfield 428, 478 is set to indicate a traffic ID, or an access class (AC), associated with, respectively, the MDPU 400, 450. The sequence number subfield 426, 476 is set to indicate a sequence number assigned to respectively, the MDPU 400, 450. In an embodiment, sequence numbers are assigned to MPDUs to identify MSDUs for acknowledgement and, if necessary, retransmission of MPDUs, as well as for properly ordering MPDUs at the receiver devices. In an embodiment, the transmitter device maintains In an embodiment, the communication device that transmits the MPDU 400, 450 maintains respective counters corresponding to different TIDs, and increments the respective counters to assign sequential numbers to the MPDUs associated with the TIDs. In an embodiment, the communication device assigns consecutive numbers to consecutive MPDUs associated with a particular TID even when the MPDUs are to be transmitted in different channel segments. Accordingly, in an embodiment, in an embodiment in which the MPDU 400 and the MPDU 450 are associated with a same TID, the sequence number subfields 426, 476 of the MPDU 400, 450 are set to consecutive sequence numbers assigned to the MPDU 400, 450 even though the MPDUs 400 and 450 are transmitted in deferent channel segments of a communication channel, in an embodiment.

Figure 5:
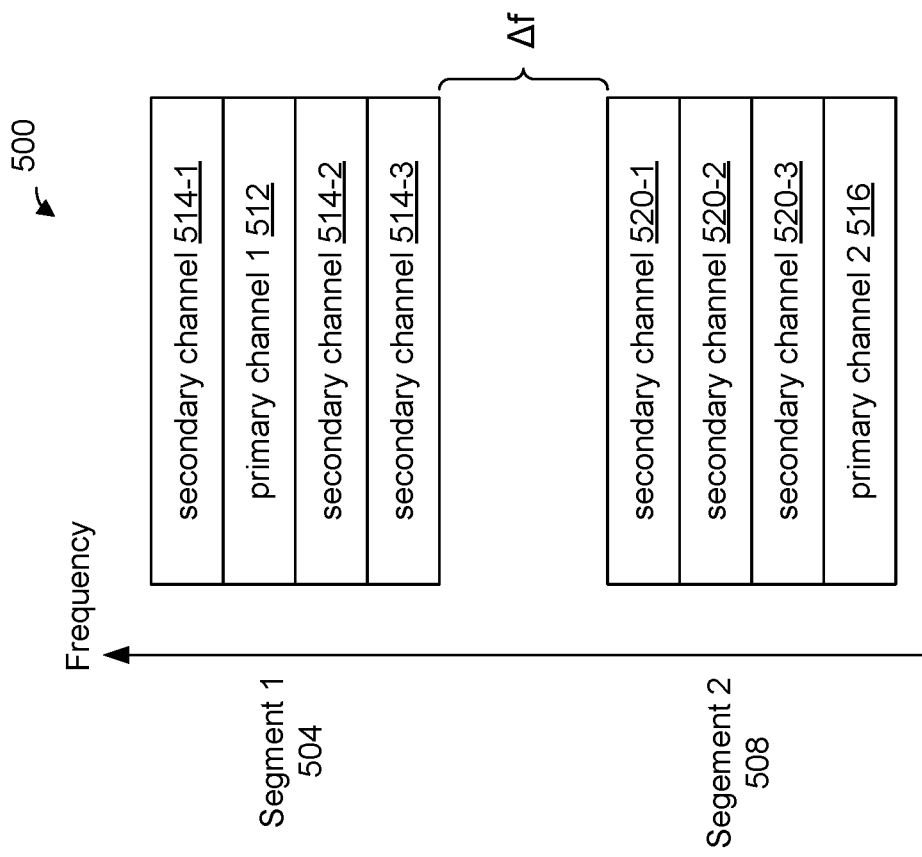
FIG. 5 is a diagram of an example communication channel used for communication in the WLAN of FIG. 1, according to an embodiment.

FIG. 5 is a diagram of an example communication channel 500 used for communication in the WLAN 110, according to an embodiment. In an embodiment, the communication channel 500 corresponds to an operating channel of the AP 114, or of a basic service set (BSS) supported by the AP 114. In another embodiment, the communication channel 500 corresponds to an operating channel of a client station 154 (e.g., the client station 154-1). In other embodiments, the communication channel 500 is employed by a communication device (e.g., an AP or a client station) in a suitable communication network different from the WLAN 110. An operating channel such as the communication channel 500 that corresponds to an operating channel of an AP or a BSS supported by the AP is sometimes referred to herein as an "AP operating channel" or a "BSS operating channel." An operating channel such as the communication channel 500 that corresponds to an operating channel of a client station is sometimes referred to herein as an "STA operating channel."

The communication channel 500 includes a first channel segment 504 aggregated with a second channel segment 508. The first channel segment 504 has a first bandwidth and comprises a first number of component channels, and the second channel segment 508 has a second bandwidth and comprises a second number of component channels. In various embodiments, the first bandwidth of the first channel segment 504 and the second bandwidth of the second channel segment 508 are equal or are unequal. In various embodiments, the first number of component channels of the first channel segment 504 and the second number of composite channels of the second channel segment 508 are equal or are unequal.

In an embodiment, the first channel segment 504 and the second channel segment 508 are non-adjacent in frequency. For example, a gap in frequency Δf exists between the first channel segment 504 and the second first channel segment 508. In various embodiments, the gap is at least 500 kHz, at least 1 MHZ, at least 5 MHZ, at least 20 MHZ, etc. In another embodiment, the first channel segment 504 and the second channel segment 508 are adjacent in frequency. In this embodiment, there is no frequency gap between first channel segment 504 and the second channel segment 508.

In an example embodiment, the first channel segment 504 has a bandwidth of 80 MHz and the second channel segment 508 has a bandwidth of 80 MHZ. In an embodiment in which the first channel segment 504 and the second channel segment 508 are not adjacent in frequency, the communication channel 500 is sometimes referred to as an 80+80 MHz channel. On the other hand, in an embodiment in which the first channel segment 504 and the second channel segment 508 are adjacent in frequency, the communication channel 500 is sometimes referred to as 160 MHz channel. In general, communication channels similar to the communication channel 500 in which the first channel segment and the second channel segment are not adjacent in frequency, the aggregate communication channel is referred to as (bandwidth of the first channel segment)+(bandwidth of the second channel segment) channel. On the other hand, communication channels similar to the communication channel 500 in which the first channel segment and the second channel segment are adjacent in frequency, or in which the second channel segment 508 is omitted (i.e., the second channel segment 508 has a bandwidth of 0 MHZ), the communication channel 500 is referred to as (the sum of the first channel segment bandwidth and the second channel segment bandwidth) channel. In an embodiment, valid channel configurations of the communication channel 500 include: 20 MHz channel, 40 MHZ channel, 60 MHz channel, 80 MHz channel, 100 MHZ, 120 MHz channel, 140 MHZ channel, channel 160 MHz channel, 20+40 MHz channel, 20+80 MHz channel, 40+80 MHz channel, and so on. In an embodiment, a respective bandwidth of each channel segment 504, 508 is selected from a set of possible channel bandwidths of 20 MHZ, 40 MHz and 80 MHz. In other embodiments, other suitable sets of possible bandwidths are utilized.

The communication channel 500 includes multiple primary channels, in the illustrated embodiment. For example, at least one component channel of the first channel segment 504 and at least one component channel of the second channel segment 508 is designated as a primary channel, in an embodiment. In the illustrated embodiment, a first component channel of the first channel segment 504 is designated as a first primary channel 512 and a second component channel of the second channel segment 508 is designated as a second primary channel 516. In some embodiments, the communication channel 500 includes more than two primary channels. For example, more than two component channels of the communication channel 500 are designated as primary channels, in some embodiments. In yet another embodiment, the communication channel 500 includes only a single primary channel. For example, only a single component channel of one of the first channel segment 504 and the second channel segment 508 is designated as a primary channel, and the other one of the first channel segment 504 and the second channel segment 508 does not include a primary channel, in an embodiment.

The communication channel 500 also includes secondary channels, in an embodiment. In an embodiment, each component channel of the first channel segment 504 that is not designated as a primary channel is designated as a secondary channel. Similarly, each component channel of the second channel segment 504 that is not designated as a primary channel is designated as a secondary channel, in an embodiment. In the illustrated embodiment, the first channel segment 504 includes three secondary channels 514 and the second communication channel segment 508 includes three secondary channels 520. In other embodiments, the first channel segment 504 and/or the second channel segment 508 includes another suitable number (e.g., 0, 1, 2, 4, 5, etc.) of secondary channels 514, 520. In some embodiments, the number of secondary channels 514 of the first channel segment 504 is not equal to the number of secondary channels 520 of the second channel segment 508. Communication devices utilizes the one or more primary channels of the communication channel 500 for various operations, such as for transmission and reception of various management transmissions (e.g., transmissions associated with association of a client station 154 with the AP 114, beacon transmissions by the AP 114, operating channel bandwidths switch announcement transmissions, etc.), for conducting clear channel assessment (CCA) procedures, etc., in various embodiments.

In an embodiment, communication devices (e.g., the AP 114, the client stations 154) are configured to generate and transmit management frames to provide information indicating capabilities and operating parameters of the communication device to other communication devices and/or to exchange capability and operation information with another communication device. For example, the AP 114 is configured to transmit beacon frames to announce capabilities of the AP 114 to communication devices that may be seeking to associate with the AP 114, in an embodiment. As another example, the AP 114 and a client station 154 are configured to exchange management frames, such as probe request/probe response frames, association request/association response frames, re-association request/re-association response frames, etc., to exchange capability parameters between the AP 114 and the client station 154. In current WLANs, a communication device, such as an AP of a client station, operating in the WLAN typically transmits management frames in a single primary channel of an operating channel of the WLAN. In an embodiment in which the WLAN 110 operates with an operating channel, such as the communication channel 500, that includes multiple channel segments, a communication device (e.g., the AP 114, a client station 154) is configured to transmit management frames in each of the multiple channel segments, where a management frame transmitted in a particular channel segment announces features supported by the communication device for operation in the particular channel segment. Transmitting management frames in each of the multiple channel segments allows other communication devices (e.g., other client stations 154) that are operating in only a particular one of the channel segments to receive the management frame in the particular one of the channel segments, in an embodiment.

In an embodiment, the AP 114 is configured to transmit respective beacon frames in respective ones of channel segments of a communication channel, wherein the respective beacon frames include information describing capabilities of the AP 114 specific to the corresponding channel segment. For example, the AP 114 is configured to transmit respective beacon frames in respective primary channels of the multiple channel segments, in an embodiment. In various embodiments, the AP 114 transmits the respective beacon frames in respective ones the channel segments simultaneously, or transmits the respective beacon frames in respective ones the channel segments at different points in time. The AP 114 generates a beacon frame for transmission in a particular channel segment to include one or more information elements that indicate parameters supported by the AP 114 for operation in the particular channel segment. In an embodiment, a beacon frame transmitted by a communication device in a particular channel segment includes a multi-band operation capability indication to indicate that the communication device supports multi-band operation. Transmitting respective beacon frames in respective ones of the channel segments to announce capabilities of the AP 114 in the respective ones of the channel segments allows communication devices that are configured for operation with only a single channel segment (e.g., in only a single frequency band) to discover the AP 114 and to determine capabilities of the AP 114 based on the beacon frame received in a single channel segment (e.g., a single frequency band), in an embodiment.

On the other hand, in a frame exchange between the AP 114 and a client station 154 that supports operation in multiple channel segments, a management frame transmitted by the AP 114 or the client station 154 in a particular channel segment announces capabilities of, respectively, the AP 114 and the client station 154, for operation in each one of the multiple channel segments. Thus, for example, probe request/probe response frames, association request/association response frames, re-association request/re-association response frames, etc. transmitted by the AP 114 or the client station 154 in a particular channel segment announce capabilities of, respectively, the AP 114 or the client station 154 for operation in each one of the multiple channel segments, in an embodiment.

In an embodiment, the AP 114 is configured to announce parameters of its operating channel (e.g., channel bandwidth, channel configuration information such as whether the channel is contiguous or includes channel segments that are not contiguous, one or more primary channels, etc.), to client stations 154 to enable the client stations 154 to associate and establish communication with the AP 114 and to subsequently operate in the BSS served by the AP 114, for example. The AP 114 announces parameters of its operating channel by including one or more operating information elements in one or more MAC data units (e.g., beacon data units) transmitted by the AP 114. In an embodiment, the AP 114 includes one or more operating information elements in a management frame, such as a beacon frame, a probe response frame, an association response frame, etc. that the AP 114 transmits in the WLN 110, where the one or operating information elements include information indicating the parameters of the operating channel. In an embodiment, the one or more operating information elements included in a management frame, such as a beacon frame, that the AP 114 broadcasts in a particular channel segment include information describing the portion of the operating channel in the particular channel segment. On the other hand, a probe response frame, an association response frame, etc. that the AP 114 transmits to a particular communication device in a particular channel segment, includes information describing the operating channel in multiple channel segments, in an embodiment.

FIG. 6 is a block diagram of a portion of a management frame 600 generated and transmitted by a communication device (e.g., the AP 114) in a particular channel segment to broadcast information in the WLAN 110, according to an embodiment. The management frame 600 is a beacon frame broadcast by the AP 114 in a primary channel of the particular channel segment, in an embodiment. The management frame 600 includes a plurality of capabilities information elements 602, including a high throughput (HT) capabilities information element 602-1, a very high throughput (VHT) capabilities information element 602-2, a high efficiency (HE) capabilities information element 602-3, and an extremely high throughput (EHT) capabilities information element 602-4. The capabilities information elements 602 include information indicating various features supported by the communication device, such encoding techniques (e.g., LDPC encoding), MCSs, channel widths, etc., supported by the communication device for operation in the particular channel segment in which the management frame 600 is transmitted. In an embodiment, the management frame 600 includes an indication of whether the communication device supports multi-segment (e.g., multi-band) operation. For example, in an embodiment, the management frame 600 includes an extended capabilities information element 602-5 which, in turn, includes a multi-segment (e.g., multi-band) support indication set to indicate whether the communication device supports multi-segment (e.g., multi-band) operation, in an embodiment. In an embodiment, if the multi-segment support indication is set to indicate that the communication device supports multi-segment operation, this signifies that the communication device supports operation in one or more additional channel segments (e.g., in one or more additional frequency bands) in addition to the channel segment (e.g., frequency band) in which the management frame 600 is transmitted. The management frame 600 omits one or more of the capabilities information elements 602 illustrated in FIG. 6 and/or includes one or more additional information elements not illustrated in FIG. 6, in some embodiments.

The management frame 600 additionally includes a plurality of operations information elements 604, including an HT operations information element 604-1, a VHT operations information element 604-2, an HE operations information element 604-3, and an EHT operations information element 604-4, in an embodiment. The operations information elements 604 include information indicating parameters, such as channel bandwidth, channel center frequency, primary channel, etc. of the operating channel in the channel segment in which the management frame 600 is transmitted, in an embodiment. In an embodiment, the management frame 600 includes an indication of whether the communication device is operating with a multi-segment (e.g., multi-band) operating channel. For example, in an embodiment, the EHT operations information element 604-4 includes a multi-segment (e.g., multi-band) channel indication set to indicate whether the communication device is operating with a multi-segment (e.g., multi-band) operating channel, in an embodiment. In an embodiment, if the multi-segment channel indication is set to indicate that the communication device is operating with a multi-segment communication channel, this signifies that the operating channel of the communication device includes one or more additional channel segments (e.g., in one or more additional frequency bands) in addition to the channel segment and/or frequency band in which the management frame 600 is transmitted, in an embodiment. The management frame 600 omits one or more of the capabilities information elements 602 illustrated in FIG. 6 and/or includes one or more additional information elements not illustrated in FIG. 6, in some embodiments.

Although the management frame 600 is illustrated in FIG. 6 as including both i) the capabilities information elements 602 and ii) the operations information elements 604, the management frame 600 omits one of i) the capabilities information elements 602 and ii) the operations information elements 604, in some embodiments. For example, capabilities information elements 602 and operations information elements 604 are transmitted by the communication device in separate management frames, in some embodiments.

FIG. 7 is a diagram of a portion of a management frame 700 generated and transmitted by a communication device (e.g., the AP 114, the client station 154-1, etc.) in a particular channel segment to provide information to another communication device in the WLAN 110, according to an embodiment. In an embodiment, the management frame 700 is a management frame other than a beacon frame, such as a probe request frame, probe response frame, association request frame, association response frame, re-association request frame, re-association response frame, etc. The management frame 700 includes a plurality of capabilities information elements 702, including an HT capabilities information element 702-1, a VHT capabilities information element 702-2, an HE capabilities information element 702-3, and an EHT capabilities information element 702-4, that are the same as or similar to the corresponding capabilities information elements 602 of the management frame 600 of FIG. 6, in an embodiment. The management frame 700 also includes a plurality of operations information elements 702, including an HT operations information element 702-1, a VHT operations information element 702-2, an HE operations information element 702-3, and an EHT capabilities information element 702-4, that are the same as or similar to the corresponding operations information elements 602 of the management frame 600 of FIG. 6, in an embodiment.

Generally, the capabilities information elements 702 include information indicating various features supported by the communication device for operation in the channel segment in which the management frame 700 is transmitted, and the operations information elements 704 include information indicating parameters of the operating channel in the channel segment in which the management frame 700 is transmitted, in an embodiment. Although the management frame 700 is illustrated in FIG. 7 as including both i) the capabilities information elements 602 and ii) the operations information elements 704, the management frame 700 omits one of i) the capabilities information elements 702 and ii) the operations information elements 704, in some embodiments. For example, capabilities information elements 702 and operations information elements 704 are transmitted by the communication device in separate management frames, in some embodiments.

Unlike the management frame 600 of FIG. 6, the management frame 700 additionally includes capabilities and/or operations information corresponding to one or more additional channel segments (e.g., in one or more additional frequency bands) other than the particular channel segment (e.g., the particular frequency band) in which the management frame 700 is transmitted. For example, the management frame 700 includes one or more "other frequency band" information elements 712 corresponding to one or more additional frequency bands in which the communication device is configured to operate, in addition to the frequency band in which the management frame 700 is transmitted. The one or more "other frequency band" information elements 712 include additional capabilities information describing features supported by the communication device for operation in the one or more additional channel segments (e.g., in one or more additional frequency bands) and/or additional operations information indicating parameters of the operating channel in one or more additional channel segments (e.g., one or more additional frequency bands) in which the management frame 700 is transmitted, in an embodiment, in an embodiment. Accordingly, in an embodiment, whereas the management frame 600 includes capabilities information indicating features supported by the communication deice for operation in the frequency band in which the management frame 600 is transmitted, the management frame 700 includes information indicating features supported by the communication deice in each frequency band supported by the communication device. Similarly, in an embodiment, whereas the management frame 600 includes operations information indicating parameters of the operating channel of the communication device in the channel segment in which the management frame 600 is transmitted, the management frame 700 includes operations information indicating parameters of the operating channel of the communication device in each channel segment of the operating channel of the communication device.

In some embodiments, a communication device that supports operation in multiple frequency bands has common capabilities for operation in respective ones of the multiple frequency bands. For example, the IEEE 802.11be Standard may specify that certain parameters supported by communication devices capable of operating across multiple frequency bands must be common among the multiple frequency bands. As an example, in an embodiment, a communication device that is configured to operate according to the IEEE 802.11be Standard and that supports operation in multiple frequency bands, one or more of i) HT capabilities, ii) VHT capabilities, and iii) HE capabilities of the communication device are the same in the multiple frequency bands, with the exception of different bandwidths being supported by the communication device for operation in the multiple frequency bands. In an embodiment, in each bandwidth supported by the communication device in the frequency bands, the supported MCS and Nss set supported for EHT operation includes at least the MCS and Nss set supported by the communication device in the corresponding bandwidth for HE operation.

In some embodiments, a communication device that supports operation in multiple frequency bands supports has common capabilities for operation in respective ones of the multiple frequency bands. For example, the IEEE 802.11be Standard may specify that certain parameters supported by communication devices capable of operating across multiple frequency bands must be common among the multiple frequency bands. As an example, in an embodiment, a communication device that is configured to operate according to the IEEE 802.11be Standard and that supports operation in multiple frequency bands, one or more of i) HT capabilities, ii) VHT capabilities, and iii) HE capabilities of the communication device are the same in the multiple frequency bands, with the exception of different bandwidths being supported by the communication device for operation in the multiple frequency bands. In an embodiment, in each bandwidth supported by the communication device in the frequency bands, the supported MCS and Nss set supported for EHT operation includes at least the MCS and Nss set supported by the communication device in the corresponding bandwidth for HE operation.

In an embodiment, a communication device (e.g., the AP 114, the client station 154-1) generates and transmits a MAC data unit, such as an operating mode notification frame, that includes information indicating a change of, or an update to, a parameter of the operating channel of the communication device. For example, the communication device generates transmits a MAC data to update a bandwidth of one or more of multiple channel segments of the operating channel. In an embodiment, the bandwidths of the multiple channel segments are updated independently. For example, the communication device updates a bandwidth of a first channel segment (e.g., the channel segment 504 in FIG. 5) to change the bandwidth of the first channel segment (e.g., from 80 MHz to 40 MHZ), without updating the bandwidth of a second channel segment (e.g., the channel segment 508 in FIG. 5) or independently updating the bandwidth of the second channel segment (e.g., from 80 MHz to 20 MHZ), in an embodiment.

In some situations, a communication device (e.g., the AP114, the client station 154-1) operating in the WLAN 110 updates one or more parameters of an operating channel of the communication device during operation of the communication device in the WLAN 110. For example, the communication device updates parameters of the operating channel to reduce or increase the bandwidth of the operating channel according to channel capacity needs of the communication device and/or to conserve power, in an embodiment. As another example, the communication device switches its operating channel to another location, the other location having better channel characteristics, to improve performance, in an embodiment. In such situations, the communication signals new parameters of the operating channel, in an embodiment. In an embodiment, to signal new parameters of the operating channel, the communication device generates and transmits a MAC data unit, such as an operating mode notification frame, that includes information indicating a change of, or an update to, a parameter of the operating channel of the communication device. For example, the communication device generates transmits a MAC data to update a bandwidth of one or more of multiple channel segments of the operating channel. In an embodiment, the bandwidths of the multiple channel segments are updated independently. For example, the communication device updates a bandwidth of a first channel segment (e.g., the channel segment 504 in FIG. 5) to change the bandwidth of the first channel segment (e.g., from 80 MHz to 40 MHz), without updating the bandwidth of a second channel segment (e.g., the channel segment 508 in FIG. 5) or independently updating the bandwidth of the second channel segment (e.g., from 80 MHz to 20 MHz), in an embodiment.

In an embodiment, communication devices (e.g., the AP 114 and client stations 154) in the WLAN 110 perform various frame exchanges for negotiating parameters to be used for communication in a multi-channel segment communication channel such as the communication channel 500. In an embodiment, in some scenarios, a first communication device (e.g., the AP 114) and a second communication device (e.g., the client station 154-1) in the WLAN 110 perform a single negotiation frame exchange to negotiate one or more parameters for communication in a communication channel between the AP 114 and the client station 154-1, where the negotiated parameters apply for communication in multiple channel segments of the communication channel. For example, the AP 114 and the client station 154-1 perform a single acknowledgement parameter negotiation frame exchange (e.g., a single ADDBA frame exchange), where the negotiated ADDBA parameters apply for communication in multiple channel segments of the communication channel, in an embodiment. On the other hand, in other scenarios, the AP114 and the client station 154-1 perform separate negotiation frame exchanges to negotiate respective parameters for communication in multiple channel segments of the communication channel, in an embodiment. For example, the AP 114 and the client station 154-1 perform respective target wake time (TWT) negotiation frame exchanges in respective ones of multiple channel segments to negotiate respective TWT parameters for communication in multiple channel segments of the communication channel, in an embodiment.

In some embodiments, the AP 114 implements multiple virtual APs for communication in a multi-channel segment communication channel such as the communication channel 500. In an embodiment, the AP 114 provides information, such as BSSIDs, associated with the multiple virtual APs to other communication devices in the WLAN 110 by including a multiple BSSID information element in a management frame, such as a beacon frame, a probe response frame, an association response frame, a re-association response frame, etc., transmitted by the AP 114. In an embodiment, the AP 114 implements different virtual APs for communication in different channel segments of the communication channel. In an embodiment, the AP 114 provides information, such as BSSIDs, associated with the multiple virtual APs to other communication devices in the WLAN 110 by transmitting respective multiple BSSID information elements corresponding to respective ones of the multiple channel segments. The AP 114 includes the respective multiple BSSID information elements in respective management frames (e.g., respective beacon frames) that the AP 114 transmits in respective ones of the multiple channel segments, or includes the respective multiple BSSID information elements in a single management frame (e.g., a probe response frame, an association response frame, a re-association response frame, etc.) that the AP 114 transmits in a particular one of the multiple channel segments, in various embodiments.

In an embodiment, the AP 114 periodically transmits traffic information to the client stations 154 to inform the client stations 154 when the AP 114 has data streams for transmission to the client stations 154. For example, the AP 114 includes a traffic indication map (TIM) element in management frames, such as a beacon frame, a probe response frame, an association response frame, a re-association response frame, etc., transmitted by the AP 114 to inform the client stations 154vwhen the AP 114 has data streams for transmission to the client stations 154. In an embodiment, when particular data streams are serviced in a particular channel segment of a communication channel, the AP 114 transmits a TIM element that includes information, such as a delivery traffic indication map (DTIM) period, bitmap control, partial virtual bitmap, etc., that is specific to the particular channel segment of the communication channel. On the other hand, when particular data streams are serviced across multiple channel segments of a communication channel, the AP 114 transmits a TIM element that includes information, such as a delivery traffic indication map (DTIM) period, bitmap control, partial virtual bitmap, etc., that applies across the multiple channel segments of the communication channel, in an embodiment.

In an embodiment, communication devices (e.g., the AP 114 and client stations 154) in the WLAN 110 contend for a wireless communication medium using clear channel assessment (CCA) procedures, such as carrier sense multiple access with collision avoidance (CSMA/CA) procedures or other suitable channel assessment procedures. The CCA procedures include a virtual carrier sensing procedure, in an embodiment. The CCA procedures also include physical carrier sensing and energy detection procedures, in an embodiment. To implement the virtual carrier sensing procedure, the communication devices maintain respective network allocation vectors (NAVs) that include timers for tracking when another communication device has seized control or "ownership" of the wireless communication medium. For example, when a communication device (e.g., the AP 114 or a client station 154) receives a valid signal, such as a PHY data unit that conforms to a particular communication protocol (e.g., the IEEE 802.11be or another suitable communication protocol), the communication device examines duration information included in a header and/or a preamble of the PHY data unit, where the duration information indicates a length of time that another communication device has taken ownership of a communication medium. The communication device then uses the duration information in the PHY data unit to set a NAV timer, and the NAV timer begins to decrement. When a value of the NAV timer is non-zero, this indicates that another communication device owns the wireless communication medium and that the communication device therefore should generally refrain from transmitting in the wireless communication medium. On the other hand, when the value of the NAV timer reaches zero, this indicates that the wireless communication medium is not currently owned by another communication device.

In an embodiment, when the NAV is zero, the communication device implements the physical carrier sensing and energy detection procedures. To implement the physical carrier sensing and energy detection procedure, the communication device senses a signal level and an energy level in the wireless communication medium for a predetermined length of time, such as a length of time corresponding to a distributed coordination function (DCF) interframe space (DIFS) time period or another suitable time period, in an embodiment. In some embodiments, the predetermined length of time depends on an access category (AC) associated with data that the communication device is attempting to transmit. For example, in an embodiment, an arbitration interframe space (AIFS) is utilized, wherein the value of the AIFS depends on the AC associated with data that the communication device is attempting to transmit. Physical carrier sensing involves valid signal detection (e.g., a transmitted PHY data unit such as the PPDU 200) in the wireless communication medium, in an embodiment, and the physical carrier sensing procedure is sometimes referred to herein as a "signal detection" procedure. In an embodiment, if the communication detects a valid signal in the wireless communication medium, the communication device decodes a duration indication in the signal and determines that the medium is busy for the duration indicated in a header and/or a preamble of the signal. In energy detection, the communication device does not detect a valid signal, but if the communication device detects an energy level that is above an energy detection threshold value, the communication device determines that the medium is busy for the duration of time for which the energy remains above the threshold.

In an embodiment, if, during the predetermined length of time, no valid signal is detected in the wireless communication medium and the detected energy in the wireless communication medium remains below an energy detection threshold, then the communication device invokes a backoff procedure in which the communication device continues to perform signal detection and energy detection in the wireless communication medium, to determine whether the wireless communication medium is busy or idle, for an additional deferral time period. In an embodiment, the backoff procedure includes randomly or pseudorandomly choosing an initial value for the backoff timer when the current value of the backoff timer is zero. In an embodiment, the communication device chooses the initial value for the backoff timer from a range of initial values [0, CW], where CW is a contention window parameter, where the initial value and CW are in units of slots, and where each slot corresponds to a suitable time period. For example, the IEEE 802.11 Standard defines slot times of 20 microseconds (IEEE 802.11b) and 9 microseconds (IEEE 802.11a, 11n, and 11ac), where different slot times are used for different versions of the protocol. In an embodiment, CW is initially set to a minimum value CWmin. However, after each failed transmission attempt (e.g., failure to receive an acknowledgment of the transmission), the value of CW is approximately doubled with an upper bound of CWmax, in an embodiment. The parameters CWmin and CWmax are also in units of slots.

In an embodiment, while the communication device determines that the wireless communication medium is idle, the communication device decrements the backoff timer. When the communication device determines that the wireless communication medium is busy, the communication device pauses the backoff timer and does not resume decrementing the backoff timer until the wireless communication medium is subsequently determined to be idle. For example, when the communication device detects a valid signal and decodes a duration field in the valid signal, the communication device pauses the backoff timer for a length of time corresponding to the duration indicated in the duration field of the valid signal, in an embodiment. As another example, when the communication device detects an energy level that is above the energy detection threshold, the communication device pauses the backoff times while the energy level remains above the energy detection threshold level, in an embodiment. When the communication device determines that the wireless communication medium is idle, the communication device resumes counting down the backoff counter. Setting the backoff timer to an initial value chosen randomly or pseudo-randomly (e.g., as described above) ensures that backoff timers of different communication devices in the network tend to reach zero at different times, in at least some embodiments. In an embodiment, when the backoff timer reaches zero, the communication device determines that the communication device is free to transmit.

In an embodiment, a communication device (e.g., the AP 114 or the client station 154-1) maintains multiple NAV timers corresponding to multiple primary channels of its operating channel. For example, with reference to FIG. 5, the communication device maintains a first NAV timer corresponding to the first primary channel 512 of the communication channel 500 of and maintains a second NAV timer corresponding to the second primary channel 516 of the communication channel 500, in an embodiment. The communication device maintains each NAV timer independently of any other NAV timer of the multiple NAV timers maintained by the communication device, in an embodiment. The communication device independently counts down each NAV timer of the multiple NAV timers, in an embodiment.

When the value of at least one NAV timer of the one or more NAV timers maintained by the communication device reaches zero, the communication device determines that at least a portion of its operating channel is now idle according to the virtual carrier sense procedure, in an embodiment. The communication device then attempts to access at least the portion of the operating channel that is determined by the virtual carrier sense procedure to be idle, in an embodiment. For example, the communication device performs a physical carrier sense procedure to determine whether the communication device is able to transmit in at least the portion of the operating channel, in an embodiment. In an embodiment, the physical carrier sense procedure includes invoking a backoff procedure as described above. In an embodiment, the communication device is configured to utilize different channel access parameters for performing physical carrier sense procedures in different channel segments. For example, the communication device is configured to utilize different channel access parameter sets, such as different enhanced distributed channel access (EDCA) parameter sets for performing physical carrier sense procedure in different channel segments. The different channel access parameter sets define different values for one or more of CWmin, CWmax, AIFS, etc., to be used for physical carrier sense procedures in different channel segments.

In an embodiment, when a backoff counter associated with a primary channel of one of the channel segments reaches zero, the communication device determines that at least the primary channel of the one of the channel segments is available for transmission by the communication device. Additionally, the communication device checks whether one or more other component channels are also available for transmission by the communication device along with the primary channel of the one or the channel segments, in an embodiment. Determining whether a secondary channel is also available for transmission by the communication device involves sensing the secondary channel a predetermined time interval, such as point coordination function (PCF) interframe space (PIFS) time period or another suitable time period. On the other hand, determining whether another primary channel of another one of the channel segments is also available for transmission by the communication device is also available for transmission by the communication device involves checking a NAV timer associated with the other primary channel and, if the NAV timer is zero, performing physical carrier sensing in the other primary channel, in an embodiment.

Figure 8:
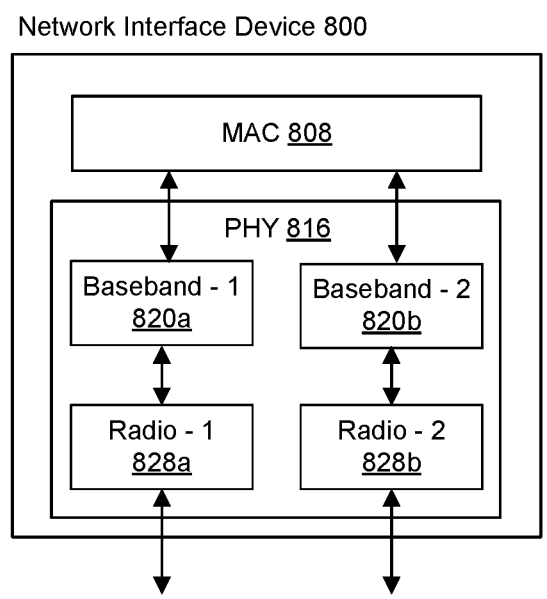
FIG. 8 is a diagram of an example network interface device configured for multi-channel segment operation, according to an embodiment.

FIG. 8 is a diagram of an example network interface device 800 configured for multi-channel segment operation, according to an embodiment. In an embodiment, the network interface device 800 corresponds to the network interface device 122 of the AP 114 of FIG. 1. In another embodiment, the network interface device 800 corresponds to the network interface device 162 of the client station 154-1 of FIG. 1.

The network interface device 800 is configured for operation over two channel segments, in the illustrated embodiment. The network interface device 800 includes a MAC processor 808 coupled to a PHY processor 816. The MAC processor 808 exchanges frames (or PSDUs) with the PHY processor 816.

In an embodiment, the MAC processor 808 corresponds to the MAC processor 126 of FIG. 1. In another embodiment, the MAC processor 808 corresponds to the MAC processor 166 of FIG. 1. In an embodiment, the PHY processor 816 corresponds to the PHY processor 130 of FIG. 1. In another embodiment, the PHY processor 816 corresponds to the PHY processor 170 of FIG. 1.

The PHY processor 816 includes a first baseband signal processor 820a corresponding to a first channel segment and a second baseband signal processor 802b corresponding to a second channel segment. The first baseband signal processor 820a is coupled to a first RF radio (Radio-1) 828a and the second baseband signal processor 802b is coupled to a second RF radio (Radio-2) 828b. In an embodiment, the RF radio 828a and the RF radio 828b correspond to the transceivers 134 of FIG. 1. In another embodiment, the RF radio 828a and the RF radio 828b correspond to the transceivers 174 of FIG. 1. In an embodiment, the RF radio 828a is configured to operate on a first RF band, and the RF radio 828b is configured to operate on a second RF band. In another embodiment, the RF radio 828a and the RF radio 828b are both configured to operate on the same RF band.

In an embodiment, the MAC processor 808 generates data corresponding to MAC layer data units (e.g., frames) and provides the frames (or PSDUs) to the baseband signal processor 820. The baseband signal processor 820 is configured to receive frames (or PSDUs) from the MAC processor 808 and encapsulate the frames (or PSDUs) into respective packets and generate respective baseband signals corresponding to the respective packets.

Although the network interface 800 is illustrated in FIG. 8 including a single MAC processor 808, the network interface device 800 includes multiple MAC processors 808, with respective ones of the multiple MAC processors 808 corresponding to respective ones of the channel segments, in some embodiments. The multiple MAC processors 808 are synchronized, in some embodiments. For example, the multiple MAC processors 808 are synchronized so that respective ones of the multiple MAC processors 808 provide respective MAC layer data units to the PHY processor 816 at a same time or during a same time interval, in an embodiment.

The baseband signal processor 820a provides the respective baseband signal generated by the baseband signal processor 820a to the Radio-1 828a. The baseband signal processor 820b provides the respective baseband signal generated by the baseband signal processor 820b to the Radio-1 828b. The Radio-1 828a and Radio-2 828b upconvert the respective baseband signals to generate respective RF signals for transmission via the first channel segment and the second channel segment, respectively. The Radio-1 828a transmits a first RF signal via the first channel segment and the Radio-2 828b transmits a second RF signal via the second channel segment.

The Radio-1 828a and the Radio-2 828b are also configured to receive respective RF signals via the first channel segment and the second channel segment, respectively. The Radio-1 828a and the Radio-2 828b generate respective baseband signals corresponding to the respective received signals. The generated respective baseband signals are provided to the respective baseband signal processors 820a and 820b. The respective baseband signal processors 820a and 820b generate respective PSDUs corresponding to the respective received signals and provide the respective PSDUs to the MAC processor 808. The MAC processor 808 processes the PSDUs received from the baseband signal processors 820a and 820b, in an embodiment.

Figure 9:
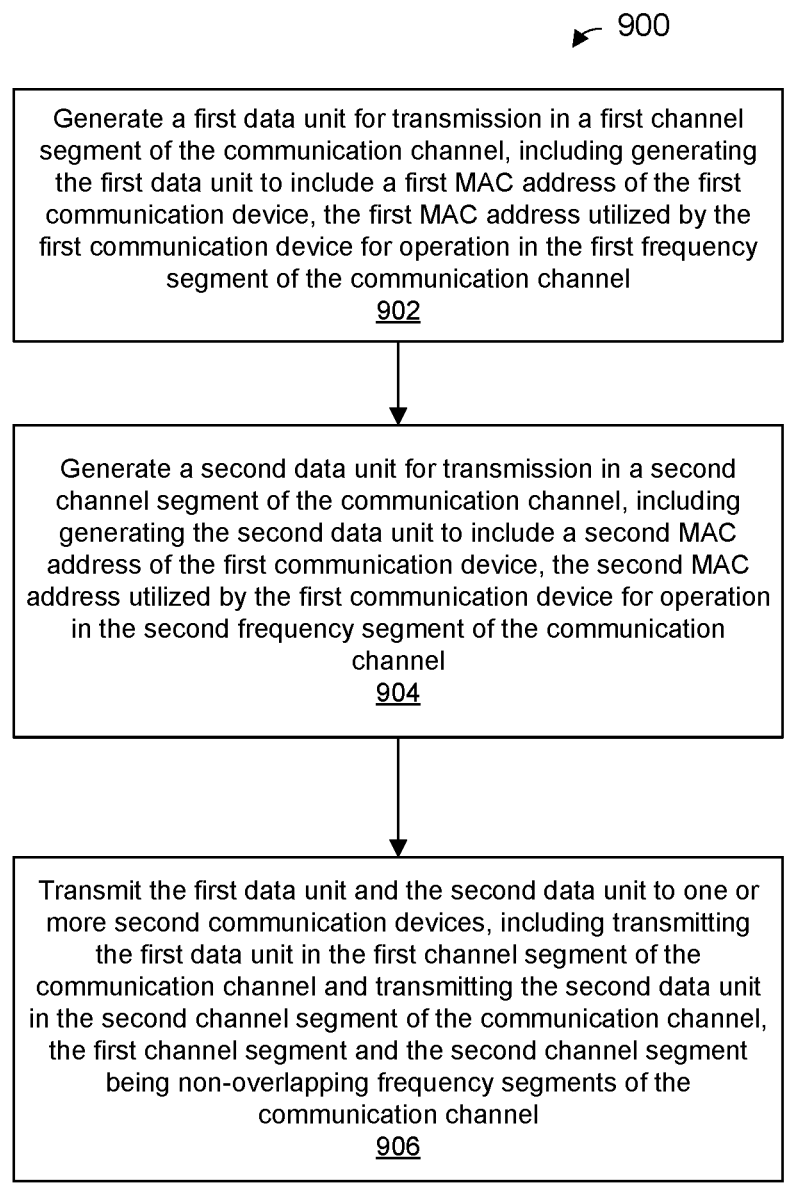
FIG. 9 is a flow diagram of an example method for operation of a first communication device in a communication channel between the first communication device and one or more second communication devices, according to an embodiment.

FIG. 9 is a flow diagram of an example method 900 for operation of a first communication device in a communication channel between the first communication device and one or more second communication devices, according to an embodiment. In some embodiments, the AP 114 of FIG. 1 is configured to implement the method 900. The method 1100 is described, however, in the context of the AP 114 merely for explanatory purposes and, in other embodiments, the method 900 is implemented by another suitable device of the WLAN 110 of FIG. 1 or by a communication device operating in a suitable network different from the WLAN 110 of FIG. 1.

At block 902, a first data unit for transmission in a first channel segment of the communication channel is generated by the AP 114. In an embodiment, the data unit 400 of FIG. 4 is generated. In another embodiment, a suitable data unit different from the data unit 400 of FIG. 4 is generated. In an embodiment, the first data unit is generated at block 902 to include a first MAC address of the AP 114. The first MAC address is utilized by the AP 114 for operation in the first channel segment of the communication channel. In an embodiment, the first data unit is generated to include the first MAC address in a source MAC address field of a MAC header of the first data unit. For example, in an embodiment in which the data unit 400 of FIG. 4 is generated, the first MAC address is included in the MAC address 1 field 410-1 of the data unit.

At block 904, a second data unit for transmission in a second channel segment of the communication channel is generated by the AP 114. In an embodiment, the data unit 450 of FIG. 4 is generated. In another embodiment, a suitable data unit different from the data unit 450 of FIG. 4 is generated. In an embodiment, the second data unit is generated at block 904 to include a second MAC address of the AP 114. The second MAC address is utilized by the AP 114 for operation in the second channel segment of the communication channel, in an embodiment. The second MAC address of the AP 114 is different from the first MAC address of the AP 114, in an embodiment. For example, the AP 114 is configured to operate multiple MAC entities (e.g., multiple MAC processors) corresponding to multiple channel segments, where different ones of the multiple MAC entities are assigned different MAC addresses, in an embodiment. In this embodiment, the first data unit is generated at block 902 by a first one of the multiple MAC entities to include the first MAC assigned to the first MAC entity, and the second data unit is generated at block 904 by a second one of the multiple MAC addresses to include the second MAC assigned to the second MAC entity.

In an embodiment, the second data unit is generated at block 904 to include the second MAC address in a source MAC address field of a MAC header of the second data unit. For example, in an embodiment in which the data unit 450 of FIG. 4 is generated, the second MAC address is included in the MAC address 1 field 460-1 of the data unit. Using different MAC addresses in different ones of the channel segments allows legacy communication devices that do not support operation with multiple channel segment aggregation to discover and associate with the AP 114 in any one of the first channel segment and the second channel segment, in an embodiment.

At block 906, the first data unit generated at block 902 and the second data unit generated at block 904 are transmitted by the AP 114. In an embodiment, the first data unit generated at block 902 is transmitted in the first channel segment of the communication channel and the second data unit generated at block 904 is transmitted in the second channel segment of the communication channel. In an embodiment, the first channel segment and the second channel segment are non-overlapping frequency segments of the communication channel. For example, the first data unit generated at block 902 is transmitted in the first channel segment 504 of the communication channel 500 of FIG. 5 and the second data unit generated at block 904 is transmitted in the second channel segment 508 of the communication channel 500 of FIG. 5, in an embodiment. In other embodiments, the first data unit and the second data unit are transmitted in channel segments of a communication channel different from the communication channel 500 of FIG. 5.

In an embodiment, a method for operation of a first communication device in a communication channel between the first communication device and one or more second communication devices includes: generating, at a network interface of the first communication device, a first data unit for transmission in a first channel segment of the communication channel, including generating the first data unit to include a first medium access control (MAC) address of the first communication device, the first MAC address utilized by the first communication device for operation in the first channel segment of the communication channel; generating, at the network interface of the first communication device, a second data unit for transmission in a second channel segment of the communication channel, including generating the second data unit to include a second MAC address of the first communication device, the second MAC address utilized by the first communication device for operation in the second channel segment of the communication channel, the second MAC address of the first communication device being different from the first MAC address of the first communication device; and transmitting, with the network interface device, the first data unit and the second data unit to the one or more second communication devices, including transmitting the first data unit in the first channel segment of the communication channel and transmitting the second data unit in the second channel segment of the communication channel, the first channel segment and the second channel segment being non-overlapping frequency segments of the communication channel.

In other embodiments, the method also includes one of, or any suitable combination of two or more of, the following features.

Transmitting the first data unit in the first channel segment of the communication channel and transmitting the second data unit in the second channel segment of the communication channel comprises transmitting the first data unit in a first frequency band and transmitting the second data unit in a second frequency band, the first frequency band being separated by a frequency gap from the second frequency band.

Transmitting the first data unit in the first frequency band comprises transmitting the first data unit in one of i) a 2.4 GHz frequency band, ii) a 5 GHz frequency band, iii) a 6 GHZ frequency band, and iv) another frequency band.

Transmitting the second data unit in the second frequency band comprises transmitting the second data unit in a different one of i) the 2.4 GHz frequency band, ii) the 5 GHz frequency band, iii) the 6 GHz frequency band, iv) the other frequency band.

Generating the first data unit further includes generating the first data unit to include a first data stream i) for a particular second communication device among the one or more second communication devices and ii) associated with a particular traffic class.

Generating the second data unit further includes generating the second data unit to include a second data stream, different from the first data stream, the second data stream i) for the particular second communication device among the one or more second communication devices and ii) associated with the particular traffic class.

Generating the first data unit includes i) assigning a first sequence number to the first data unit, the first sequence number being assigned from a sequence number set associated with the particular second communication device and the particular traffic class and ii) generating the first data unit to include the first sequence number.

Generating the second data unit includes i) assigning a second sequence number to the second data unit, the second sequence number being a next sequential number in the sequence number set associated with the particular second communication device and the particular traffic class and ii) generating the second data unit to include the second sequence number.

The method further comprises, prior to transmitting the first data unit in the first channel segment, performing, with the network interface of the first communication device, a first channel access procedure to determine that the first channel segment is available for transmission by the first communication device.

The method further comprises, prior to transmitting the second data unit in the second channel segment, performing, with the network interface of the first communication device, a second channel access procedure, independently from performing the first access procedure, to determine that the second channel segment is available for transmission by the first communication device.

Performing the first channel access procedure comprises performing the first channel access procedure based on a first set of channel access parameters utilized by the first communication device for channel access in the first channel segment.

Performing the second channel access procedure comprises performing the second channel access procedure based on a second set of channel access parameters, different from the first set of channel access parameters, utilized by the first communication device for channel access in the second channel segment.

The method further comprises, prior to transmitting the first data unit and the second data unit, receiving, at the network interface of the first communication device, one or more management frames from a particular second communication device among the one or more second communication devices, the one more management frames having been transited by the particular second communication device in one of i) the first channel segment or ii) the second channel segment, wherein the one or more management frames is for negotiating operation parameters to be used in communication between the first communication device and the particular second communication device in both i) the first channel segment and ii) the second channel segment.

Receiving the one or more management frames from the particular second communication device comprises receiving a block acknowledgement negotiation management frame for negotiating block acknowledgement parameters, wherein the block acknowledgement parameters are to be used in communication between the first communication device and the particular second communication device in both i) the first channel segment and ii) the second channel segment.

The method further comprises, prior to transmitting the first data unit and the second data unit, transmitting, with the network interface of the first communication device, one or more management frames to a particular second communication device among the one or more second communication devices, the one or more management frames i) transmitted in one of a) the first channel segment or b) the second channel segment and ii) including indications of features supported by the first communication device for operation in both a) the first channel segment or b) the second channel segment.

In another embodiment, a first communication device configured for communication with one or more second communication devices over a communication channel comprises a network interface device having one or more integrated circuit (IC) devices configured to: generate a first data unit for transmission in a first channel segment of the communication channel, including generating the first data unit to include a first medium access control (MAC) address of the first communication device, the first MAC address utilized by the first communication device for operation in the first channel segment of the communication channel; generate a second data unit for transmission in a second channel segment of the communication channel, including generating the second data unit to include a second MAC address of the first communication device, the second MAC address utilized by the first communication device for operation in the second channel segment of the communication channel, the second MAC address of the first communication device being different from the first MAC address of the first communication device; and transmit the first data unit and the second data unit to the one or more second communication devices, including transmitting the first data unit in the first channel segment of the communication channel and transmitting the second data unit in the second channel segment of the communication channel, the first channel segment and the second channel segment being non-overlapping frequency segments of the communication channel.

In other embodiments, the first communication device also comprises one of, or any suitable combination of two or more of, the following features.

The one or more IC devices are configured to transmit the first data unit in a first frequency band and transmit the second data unit in a second frequency band, the first frequency band being separated by a frequency gap from the second frequency band.

The one or more IC devices are configured to transmit the first data unit in one of i) a 2.4 GHz frequency band, ii) a 5 GHz frequency band, iii) a 6 GHz frequency band, and iv) another frequency band.

The one or more IC devices are configured to transmit the second data unit in another one of i) the 2.4 GHz frequency band, ii) the 5 GHz frequency band, iii) the 6 GHz frequency band and iv) the other frequency band.

The one or more IC devices are configured to generate the first data unit to further include a first data stream i) for a particular second communication device among the one or more second communication devices and ii) associated with a particular traffic class.

The one or more IC devices are configured to generate the second data unit to further include a second data stream, different from the first data stream, the second data stream i) for the particular second communication device among the one or more second communication devices and ii) associated with the particular traffic class.

The one or more IC devices are configured to assign a first sequence number to the first data unit, the first sequence number being assigned from a sequence number set associated with the particular second communication device and the particular traffic class, and generate the first data unit to further include the first sequence number.

The one or more IC devices are configured to assign a second sequence number to the second data unit, the second sequence number being a next sequential number in the sequence number set associated with the particular second communication device and the particular traffic class and generate the second data unit to further include the second sequence number.

The one or more IC devices are further configured to, prior to transmitting the first data unit in the first channel segment, perform a first channel access procedure to determine that the first channel segment is available for transmission by the first communication device.

The one or more IC devices are further configured to, prior to transmitting the second data unit in the second channel segment, perform a second channel access procedure, independently from performing the first access procedure, to determine that the second channel segment is available for transmission by the first communication device.

The one or more IC devices are configured to perform the first channel access procedure based on a first set of channel access parameters utilized by the first communication device for channel access in the first channel segment.

The one or more IC devices are configured to perform the second channel access procedure based on a second set of channel access parameters, different from the first set of channel access parameters, utilized by the first communication device for channel access in the second channel segment.

The one or more IC devices are further configured to, prior to transmitting the first data unit and the second data unit, receive one or more management frames from a particular second communication device among the one or more second communication devices, the one more management frames having been transited by the particular second communication device in one of i) the first channel segment or ii) the second channel segment, wherein the one or more management frames is for negotiating operation parameters to be used in communication between the first communication device and the particular second communication device in both i) the first channel segment and ii) the second channel segment.

The one or more IC devices are configured to receiving the one or more management frames from the particular second communication device at least by receiving a block acknowledgement negotiation management frame for negotiating block acknowledgement parameters, wherein the block acknowledgement parameters are to be used in communication between the first communication device and the particular second communication device in both i) the first channel segment and ii) the second channel segment.

The one or more IC devices are further configured to prior to transmitting the first data unit and the second data unit, transmit one or more management frames to a particular second communication device among the one or more second communication devices, the one or more management frames i) transmitted in one of a) the first channel segment or b) the second channel segment and ii) including indications of features supported by the first communication device for operation in both a) the first channel segment or b) the second channel segment.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method of operation in a wireless local area network (WLAN), the method comprising:
receiving, at a wireless network interface of a client station, a first data unit from an access point (AP), the first data unit including a first WLAN management frame having an indication that the AP is operating in a plurality of frequency segments, and the first WLAN management frame including respective MAC addresses utilized by the AP for operation in the respective frequency segments;

responsive to receiving the first WLAN management frame, generating, at the wireless network interface, a second WLAN management frame, the second WLAN management frame including, for each of multiple frequency segments among the plurality of frequency segments, respective operation information indicating respective operation parameters of the client station for the respective frequency segment;

transmitting, by the wireless network interface, a second data unit having the second WLAN management frame in connection with establishing communication with the AP using the multiple frequency segments;

receiving, at the wireless network interface, a third data unit via a first frequency segment among the plurality of frequency segments, the third data unit having i) a MAC address field set to a first MAC address used by the AP for operation in the first frequency segment, ii) a traffic identifier (TID) field set to a TID value, and iii) a sequence number field set to a first sequence number value from a sequence number set associated with the wireless network interface and the TID value; and receiving, at the wireless network interface, a fourth data unit via a second frequency segment among the plurality of frequency segments, the fourth data unit having i) a MAC address field set to a second MAC address used by the AP for operation in the second frequency segment, ii) a TID field set to the TID value, and iii) a sequence number field set to a second sequence number value, the second sequence number being a next sequential number in the sequence number set after the first sequence number.

2. The method of claim 1, wherein the plurality of frequency segments includes a first frequency band and a second frequency band separated in frequency from the first frequency band by a frequency gap.

3. The method of claim 2, wherein:
the first frequency band is one of i) a 2.4 GHz frequency band, ii) a 5 GHz frequency band, and iii) a 6 GHz frequency band; and
the second frequency band is a different one of i) the 2.4 GHz frequency band, ii) the 5 GHz frequency band, and iii) the 6 GHz frequency band.

4. The method of claim 1, wherein the first WLAN management frame includes:
for each frequency segment, a respective indication of a respective primary channel in the respective frequency segment.

5. The method of claim 1, wherein the first WLAN management frame includes:
for each frequency segment, a respective indication of a respective operating channel bandwidth in the respective frequency segment.

6. The method of claim 1, wherein the first WLAN management frame includes:
for each frequency segment, a respective indication of a respective center frequency of the respective frequency segment.

7. The method of claim 1, wherein the first WLAN management frame includes:
for each frequency segment, a respective indication of whether a respective operating channel in the respective frequency segment is contiguous in frequency.

8. The method of claim 1, further comprising:
generating, at the wireless network interface, a third data unit that includes information for negotiating operation parameters to be used in communication between the AP and the client station in multiple ones of the frequency segments; and
transmitting, by the wireless network interface, the third data unit to the AP in connection with negotiating operation parameters to be used in communication between the AP and the client station in multiple ones of the frequency segments.

9. The method of claim 8, wherein generating the third data unit comprises generating the third data unit to include proposed block acknowledgement parameters in connection with negotiating block acknowledgement parameters to be used in communication between the access point and the client station in the multiple ones of the frequency segments.

10. A communication device, comprising:
a wireless network interface device corresponding to a client station in a wireless local area network (WLAN), the wireless network device having one or more integrated circuit (IC) devices configured to:
receive a first data unit from an access point (AP) of the WLAN, the first data unit including a first WLAN management frame having an indication that the AP is operating in a plurality of frequency segments, and the first WLAN management frame including respective MAC addresses utilized by the AP for operation in the respective frequency segments,
responsive to receiving the first WLAN management frame, generate a second WLAN management frame, the second WLAN management frame including, for each of multiple frequency segments among the plurality of frequency segments, respective operation information indicating respective operation parameters of the client station for the respective frequency segment, and
control the wireless network interface to transmit a second data unit having the second WLAN management frame in connection with establishing communication with the AP using the multiple frequency segments,
receive a third data unit via a first frequency segment among the plurality of frequency segments, the third data unit having i) a MAC address field set to a first MAC address used by the AP for operation in the first frequency segment, ii) a traffic identifier (TID) field set to a TID value, and iii) a sequence number field set to a first sequence number value from a sequence number set associated with the wireless network interface and the TID value, and
receive a fourth data unit via a second frequency segment among the plurality of frequency segments, the fourth data unit having i) a MAC address field set to a second MAC address used by the AP for operation in the second frequency segment, ii) a TID field set to the TID value, and iii) a sequence number field set to a second sequence number value, the second sequence number being a next sequential number in the sequence number set after the first sequence number.

11. The communication device of claim 10, wherein the plurality of frequency segments includes a first frequency band and a second frequency band separated in frequency from the first frequency band by a frequency gap.

12. The communication device of claim 11, wherein:
the first frequency band is one of i) a 2.4 GHz frequency band, ii) a 5 GHz frequency band, and iii) a 6 GHz frequency band; and
the second frequency band is a different one of i) the 2.4 GHz frequency band, ii) the 5 GHz frequency band, and iii) the 6 GHz frequency band.

13. The communication device of claim 10, wherein the first WLAN management frame includes:
for each frequency segment, a respective indication of a respective primary channel in the respective frequency segment.

14. The communication device of claim 10, wherein the first WLAN management frame includes:
for each frequency segment, a respective indication of a respective operating channel bandwidth in the respective frequency segment.

15. The communication device of claim 10, wherein the first WLAN management frame includes:
for each frequency segment, a respective indication of a respective center frequency of the respective frequency segment.

16. The communication device of claim 10, wherein the first WLAN management frame includes:
for each frequency segment, a respective indication of whether a respective operating channel in the respective frequency segment is contiguous in frequency.

17. The communication device of claim 10, further comprising:
generating, at the wireless network interface, a third data unit that includes information for negotiating operation parameters to be used in communication between the AP and the client station in multiple ones of the frequency segments; and
transmitting, by the wireless network interface, the third data unit to the AP in connection with negotiating operation parameters to be used in communication between the AP and the client station in multiple ones of the frequency segments.

18. The communication device of claim 17, wherein generating the third data unit comprises generating the third data unit to include proposed block acknowledgement parameters in connection with negotiating block acknowledgement parameters to be used in communication between the access point and the client station in the multiple ones of the frequency segments.

19. The communication device of claim 10, wherein the wireless network interface comprises:
one or more transceivers implemented using the one or more IC devices.

20. The communication device of claim 19, further comprising:
one or more antennas coupled to the one or more transceivers.

* * * * *